United States Patent
Bae et al.

(10) Patent No.: US 10,802,201 B2
(45) Date of Patent: Oct. 13, 2020

(54) DISPLAY DEVICE WHICH PREVENTS FORMATION OF PARASITIC CAPACITOR IN A PIXEL

(71) Applicant: Samsung Display Co., Ltd., Yongin-Si, Gyeonggi-Do (KR)

(72) Inventors: Kwangsoo Bae, Yongin-si (KR); Jungsuk Bang, Hwaseong-si (KR); Minjeong Oh, Gimpo-si (KR); Haeju Yun, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1 day.

(21) Appl. No.: 16/103,069

(22) Filed: Aug. 14, 2018

(65) Prior Publication Data
US 2019/0094450 A1    Mar. 28, 2019

(30) Foreign Application Priority Data
Sep. 22, 2017 (KR) .......................... 10-2017-0122830

(51) Int. Cl.
*F21V 8/00* (2006.01)
*G02F 1/1335* (2006.01)

(52) U.S. Cl.
CPC ........... *G02B 6/0053* (2013.01); *G02B 6/005* (2013.01); *G02B 6/0036* (2013.01); *G02F 1/133526* (2013.01)

(58) Field of Classification Search
CPC .............................. G02B 6/0053; G02B 6/006
See application file for complete search history.

(56) References Cited

U.S. PATENT DOCUMENTS

| 7,060,961 B2 | 6/2006 | Dobashi et al. |
| 9,645,295 B2 | 5/2017 | Zhang |
| 2010/0302218 A1 | 12/2010 | Bita et al. |
| 2017/0059764 A1 | 3/2017 | Li |
| 2018/0052365 A1 | 2/2018 | Bae et al. |
| 2018/0106941 A1* | 4/2018 | Yun ........................ G02B 6/005 |
| 2018/0196302 A1 | 7/2018 | Bae et al. |

FOREIGN PATENT DOCUMENTS

| JP | 2004227835 A | 8/2004 |
| JP | 4316559 B2 | 8/2009 |
| JP | 4708721 B2 | 6/2011 |

(Continued)

*Primary Examiner* — Thanh Nhan P Nguyen
(74) *Attorney, Agent, or Firm* — Cantor Colburn LLP

(57) ABSTRACT

A display apparatus includes a display module which displays an image and a backlight unit disposed below the display module. The backlight unit includes a light source which generates light, a light guide member including a light incident surface which receives the light from the light source and an opposite surface facing the light incident surface in a first direction, and a light collection member which is disposed on the light guide member and receives the light from the light guide member to control a traveling direction of the light so that the light travels to the display module. The light collection member includes an upper light collection layer including upper light collection patterns, each of which has a curved top surface and a lower light collection layer including lower light collection patterns and an intermediate layer which covers the lower light collection patterns.

19 Claims, 17 Drawing Sheets

(56) References Cited

FOREIGN PATENT DOCUMENTS

| JP | 5484567 B2 | 5/2014 |
| JP | 5653576 B2 | 1/2015 |
| KR | 1020150048354 A | 5/2015 |
| KR | 1020180026611 A | 3/2018 |
| KR | 1020180041813 A | 4/2018 |
| KR | 1020180046440 A | 5/2018 |
| KR | 1020180083031 A | 7/2018 |

* cited by examiner

DISPLAY DEVICE WHICH PREVENTS FORMATION OF PARASITIC CAPACITOR IN A PIXEL

This application claims priority to Korean Patent Application No. 10-2017-0122830, filed on Sep. 22, 2017, and all the benefits accruing therefrom under 35 U.S.C. § 119, the content of which in its entirety is herein incorporated by reference.

BACKGROUND

1. Field

Exemplary embodiments of the invention herein relate to a display apparatus, and more particularly, to a display apparatus having improved light collection efficiency.

2. Description of the Related Art

Display apparatuses have been in a spotlight as next-generation high-tech display devices because of various advantages such as low power consumption, good portability, and high added value. Such display apparatuses may include a thin film transistor for each pixel to adjust on/off of a voltage for each pixel.

The display apparatuses may include a display panel and a backlight unit providing light to the display panel. The backlight unit may include a light source and a light guide plate. Light generated from the light source is guided to an inside of the light guide plate and then provided to the display panel.

SUMMARY

Exemplary embodiments of the invention provide a display apparatus having improved light collection efficiency.

An exemplary embodiment of the invention provides a display apparatus including a display module which displays an image, and a backlight unit disposed below the display module, where the backlight unit includes a light source which generates light, a light guide member including a light incident surface which receives the light from the light source and an opposite surface facing the light incident surface in a first direction, and a light collection member which is disposed on the light guide member and receives the light from the light guide member to control a traveling direction of the light so that the light travels to the display module, where the light collection member includes an upper light collection layer including upper light collection patterns, each of which has a curved top surface, and a lower light collection layer including lower light collection patterns and an intermediate layer which covers the lower light collection patterns, the lower light collection layer being disposed between the light guide member and the upper light collection layer.

In an exemplary embodiment, each of the lower light collection patterns includes a top surface, a bottom surface, and a side surface which connects the top surface to the bottom surface and of which at least a portion is inclined to the opposite surface, a first curved area inclined from a peak pint to the opposite surface is defined on the top surface of the upper light collection pattern, a center of the top surface is spaced apart with a first distance from the peak point in a direction from the opposite surface to the light incident surface in a plan view, and the first distance is less than a distance between a point of the top surface, which is closest to the opposite surface, and the center of the top surface.

In an exemplary embodiment, a lower light collection pattern of the lower light collection patterns may have a refractive index greater than that of the light guide member, and the light guide member may have a refractive index greater than that of the intermediate layer.

In an exemplary embodiment, the upper light collection pattern may have the same refractive index as that of the intermediate layer.

In an exemplary embodiment, the upper light collection layer may further include a protection layer which covers the upper light collection pattern, and the protection layer may have a refractive index greater than that of the upper light collection pattern.

In an exemplary embodiment, the top surface entirely may overlap the bottom surface in the plan view, and the top surface may have an area less than that of the bottom surface.

In an exemplary embodiment, a lower light collection pattern of the lower light collection patterns may have a truncated cone shape.

In an exemplary embodiment, the side surface and the bottom surface of a lower light collection pattern of the lower light collection patterns may have an angle of about 50 degrees to about 90 degrees therebetween.

In an exemplary embodiment, the more an angle between the side surface and the bottom surface of a lower light collection pattern of the lower light collection patterns decreases, the more a size of the upper light collection pattern may increase.

In an exemplary embodiment, the more a distance between the upper light collection patterns increases in the direction from the opposite surface to the light incident surface, the more a thickness of the intermediate layer may increase.

In an exemplary embodiment, a lower light collection pattern of the lower light collection patterns may entirely overlap the upper light collection pattern in the plan view.

In an exemplary embodiment, the upper light collection pattern may include a first portion including the first curved area on the top surface, and a second portion including a second curved area, which is inclined from the peak point to the light incident surface, on the top surface.

In an exemplary embodiment, the upper light collection pattern may have a circular shape in the plan view.

In an exemplary embodiment, the upper light collection patterns may be disposed to one-to-one correspond to the plurality of lower light collection patterns.

In an exemplary embodiment, in a cross-section parallel to the first direction, an n-th upper light collection pattern of the upper light collection patterns may partially overlap an (n+1)-th lower light collection pattern of the plurality of lower light collection patterns.

In an exemplary embodiment, the upper light collection pattern may have a semicircular shape in the plan view.

In an exemplary embodiment, the upper light collection patterns may be arranged in the first direction, and each of the upper light collection patterns may have a rectangular shape extending in a direction perpendicular to the first direction in the plan view, and one of the upper light collection patterns may be disposed to overlap the lower light collection patterns.

In an exemplary embodiment, the display module may include a lower substrate, an upper substrate facing the lower substrate, a light conversion layer disposed below the upper substrate, and a liquid crystal layer disposed between the lower substrate and the light conversion layer, where the light conversion layer may include a plurality of quantum dots.

In an exemplary embodiment, the backlight unit may further include a first reflection member disposed below the light guide member, and a second reflection member disposed on the opposite surface of the light guide member.

In an exemplary embodiment of the invention, a display apparatus includes a display module which displays an image, and a backlight unit disposed below the display module, where the backlight unit includes a light source which generates light, a light guide member including a light incident surface which receives the light from the light source and an opposite surface facing the light incident surface in a first direction, and a light collection member which is disposed on the light guide member and receives the light from the light guide member to control a traveling direction of the light so that the light travels to the display module, where the light collection member includes an upper light collection layer including an upper light collection pattern having a curved top surface, and a lower light collection layer which includes a lower light collection pattern and an intermediate layer having a refractive index less than that of the lower light collection pattern and covers the lower light collection pattern, the lower light collection layer being disposed between the light guide member and the upper light collection layer, where the lower light collection pattern includes a top surface, a bottom surface, and a side surface which connects the top surface to the bottom surface and of which at least a portion is inclined to the opposite surface, a first curved area inclined from a peak pint to the opposite surface is defined on the top surface of the upper light collection pattern, and a point, which is closest to the opposite surface, on the top surface of the lower light collection pattern overlaps the first curved area in a plan view.

In an exemplary embodiment of the invention, a display apparatus includes a light source which generates light, a light guide member including a light incident surface which receives the light from the light source and an opposite surface facing the light incident surface in a first direction, and a light collection member which is disposed on the light guide member and receives the light from the light guide member, where the light collection member includes an upper light collection layer including an upper light collection pattern having a curved top surface, and a lower light collection layer which includes a lower light collection pattern and an intermediate layer having a refractive index less than that of the lower light collection pattern and covers the lower light collection pattern, the lower light collection layer being disposed between the light guide member and the upper light collection layer, where the lower light collection pattern includes a top surface, a bottom surface, and a side surface which connects the top surface to the bottom surface and of which at least a portion is inclined to the opposite surface, and a first curved area defined by the top surface of the upper light collection pattern overlaps at least a portion of the side surface of the lower light collection pattern, where a product of an inclination angle defining an imaginary line of the overlapping portion of the lower light collection pattern and an inclination angle defining another imaginary line of the first curved area has a positive number.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
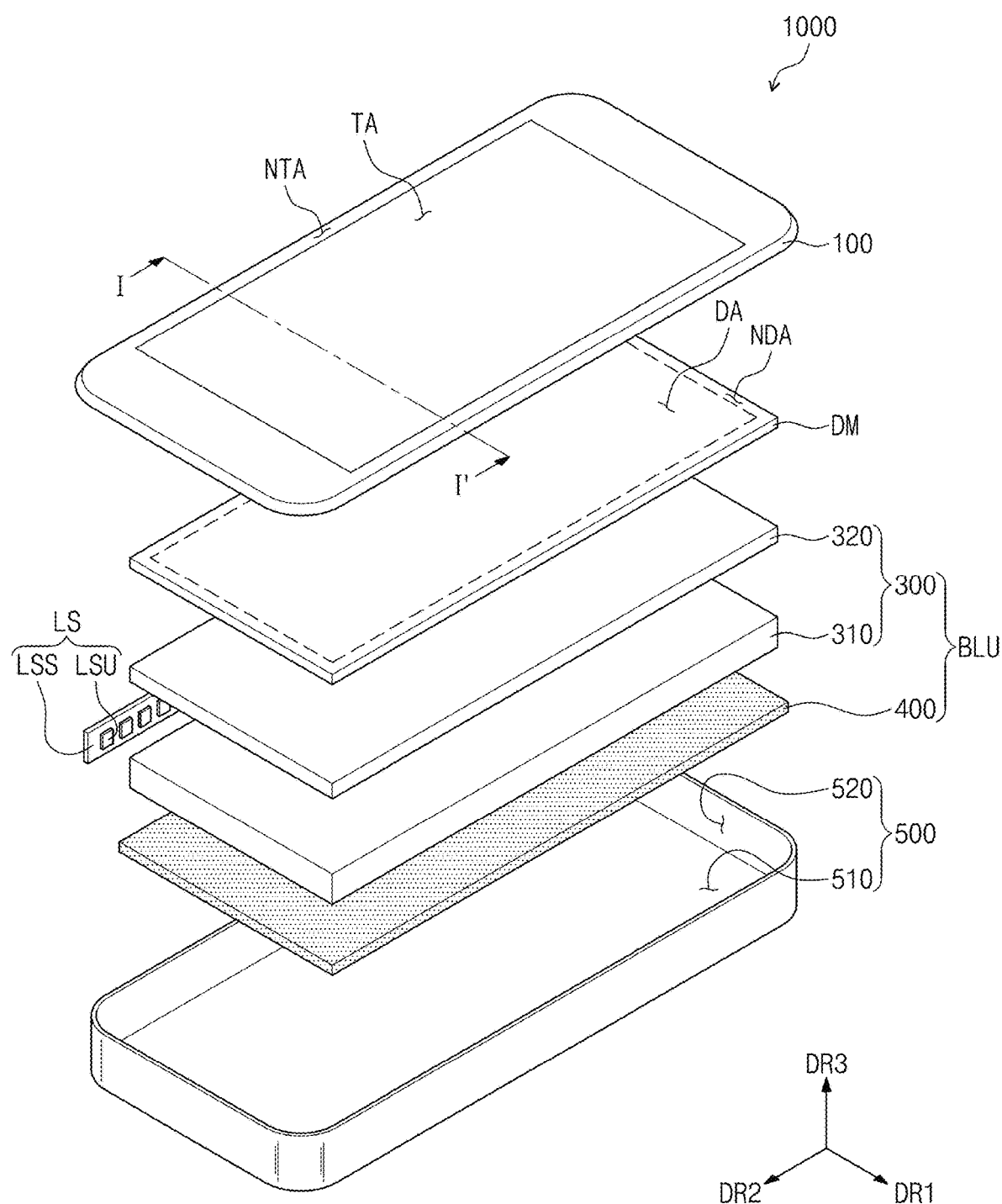
FIG. 1 is an exploded perspective view of an exemplary embodiment of a display apparatus according to the invention.

Advantages and features of the invention, and implementation methods thereof will be clarified through following embodiments described with reference to the accompanying drawings. The invention may, however, be embodied in different forms and should not be construed as limited to the exemplary embodiments set forth herein. Rather, these embodiments are provided so that this invention will be thorough and complete, and will fully convey the scope of the invention to those skilled in the art. Further, the invention is only defined by scopes of claims. Like reference numerals refer to like elements throughout.

It will also be understood that when an element or a layer is referred to as being "on" another element or layer, it can be directly on the other element or layer, or intervening layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper" and the like, may be used herein for ease of description to describe one element or feature's relationship to another element(s) or feature(s) as illustrated in the drawing figures. The spatially relative terms should be understood as terms which include different directions of configurative elements in addition to directions illustrated in the drawing figures when using or operating the invention. Like reference numerals refer to like elements throughout.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

It will be understood that although the terms of first and second are used herein to describe various elements and/or sections, these elements and/or sections should not be limited by these terms. These terms are only used to distinguish one element, component, or section from another element, component, or section. Accordingly, a first element, a first component, or a first section that will be described below may be a second element, a second component, or a second section within the technical idea of the invention.

The exemplary embodiments in the detailed description will be described with schematic cross-sectional views and/or plan views as ideal exemplary views of the invention. Accordingly, shapes of the exemplary views may be modified according to manufacturing techniques and/or allowable errors. Therefore, the exemplary embodiments of the invention are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the invention.

Hereinafter, exemplary embodiments of the invention will be described below in more detail with reference to the accompanying drawings.

Figure 2:
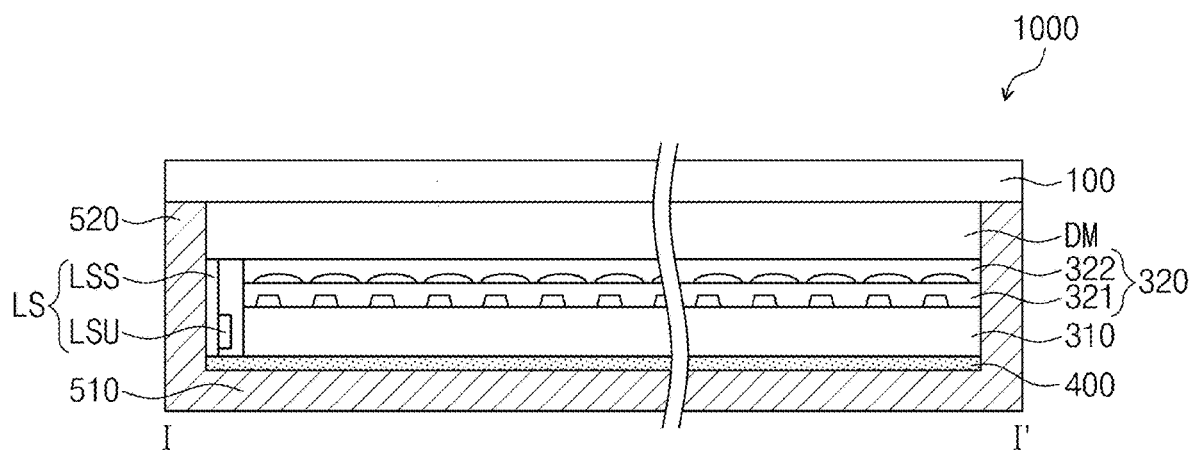
FIG. 2 is a cross-sectional view of the display apparatus of FIG. 1.
Figure 2:
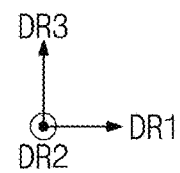

FIG. 1 is an exploded perspective view of a display apparatus according to an exemplary embodiment of the invention, and FIG. 2 is a cross-sectional view of the display apparatus of FIG. 1.

Referring to FIGS. 1 and 2, a display apparatus 1000 according to an exemplary embodiment of the invention has a rectangular shape with a short side in a first direction DR1 and a long side in a second direction DR2. However, a display apparatus 1000 according to the invention is not limited to the above-described shape and thus may have various shapes.

The display apparatus 1000 includes a window member 100, a display module, a backlight unit BLU, and an accommodation member 500.

For convenience of description, a direction in which an image is provided from the display apparatus 1000 may be defined as an upward direction, and a direction opposite to the upward direction may be defined as a downward direction. In this exemplary embodiment, upward and downward directions are parallel to a third direction DR3 that is defined in a normal direction of a plane defined by the first and second directions DR1 and DR2. The third direction DR3 may be a reference direction for dividing front and rear surfaces of components that will be described below. However, the upward direction and the downward direction may be a relative concept and thus be changed in different directions.

The window member 100 may include a light transmitting part TA that transmits an image provided from the display module DM and a light blocking part NTA which is adjacent to the light transmitting part TA and through which the image is not transmitted. The light transmitting part TA is disposed on a central portion of the display apparatus 1000 on a plane defined by the first and second directions DR1 and DR2. The light blocking part NTA is disposed around the light transmitting part TA and has a frame shape surrounding the light transmitting part TA.

According to another exemplary embodiment of the invention, the window member 100 of the display apparatus 1000 may include only the light transmitting part TA. That is, in another exemplary embodiment, the light blocking part NTA may be omitted. In this case, an image may be transmitted through an entire top surface of the window member 100.

In an exemplary embodiment, the window member 100 may include a material including glass, sapphire, or plastic, for example.

The display module DM is disposed below the window member 100. The display module DM displays an image by light provided from the backlight unit BLU.

A display area DA on which an image is displayed on the display module DM and a non-display area NDA on which the image is not displayed are defined in the plan view. The display area DA may be defined at a center of the display module DM in the plan view to overlap the light transmitting part TA of the window member 100. Hereinafter, the display module DM will be described in more detail with reference to FIG. 3.

The backlight unit BLU may be disposed below the display module DM to provide light the display module DM. According to this exemplary embodiment, the backlight unit BLU may be an edge-type backlight unit.

The backlight unit BLU may include a light source LS, an optical member 300, and a reflection member 400.

The light source LS is disposed at one side of the optical member 300 in the first direction DR1. However, the invention is not limited to the position of the light source LS. In an exemplary embodiment, the light source LS may be disposed adjacent to at least one side surface of side surfaces of the optical member 300, for example.

The light source LS includes a plurality of light source units LSU and a light source substrate LSS. The light source units LSU generates light and provides the generated light to the optical member 300 so that the generated light is provide to the display module DM.

According to this exemplary embodiment, each of the light source units LSU may have a shape in which a light emitting diode ("LED") is used as a point light source. However, the invention is not limited to the kind of light source units LSU.

Also, the invention is not limited to the number of light source units LSU. According to another exemplary embodiment of the invention, the light source unit LSU may not be provided in plural, but be provided as one point light source using the LED. In an alternative exemplary embodiment, the light source units LSU may be provided with a plurality of LED groups. Also, according to another exemplary embodiment of the invention, the light source units LSU may be a line light source.

The light source units LSU may be disposed (e.g., mounted) on the light source substrate LSS. The light source substrate LSS may be disposed to face the one side of the optical member 300 in the first direction DR1 to extend in the second direction DR2. The light source substrate LSS may include a light source control unit (not shown) connected to the light source units LSU. The light source control unit (not shown) may analyze an image displayed on the display panel DP to output a local dimming signal and control luminance of light generated by the light source LS in response to the local dimming signal. According to another exemplary embodiment of the invention, the light source control unit (not shown) may be disposed (e.g., mounted) on a separate circuit board. Here, the invention is not limited to the disposed (e.g., mounted) position of the light source control unit.

The optical member 300 is disposed below the display module DM. The optical member 300 includes a light guide member 310 and a light collection member 320. The optical member 300 may have a structure in which the light guide member 310 and the light collection member 320 are coupled.

The light guide member 310 may have a plate shape. The light guide member 310 may change a traveling direction of the light provided from the light source LS so that the light travels in the upward direction in which the display panel 110 is disposed. Although not shown, a diffusion pattern (not shown) may be disposed on a bottom surface of the light guide member 310.

The light source LS may be disposed on one side of the light guide member 310 in the first direction DR1. One side surface of side surfaces of the light guide member 310, which is adjacent to the light source LS, is defined as a light incident surface. Also, one side surface of the side surfaces of the light guide member 310, which faces the light incident surface, is defined as an opposite surface. That is, the light incident surface is disposed on one side of the light guide member 310 in the first direction DR1, and the opposite surface is disposed on the other side of the light guide member 310.

The light guide member 310 may include a material having high light transmittance in a visible light region. In an exemplary embodiment, the light guide member 310 may include a glass material, for example. The light guide member 310 is not limited to the above-described material. According to another exemplary embodiment, the light guide member 310 may include a transparent polymer resin such as polycarbonate or polymethyl methacrylate ("PMMA").

The light guide member 310 has a first refractive index n1. In an exemplary embodiment, the first refractive index n1 may range from about 1.4 to about 1.6, for example.

The light collection member 320 is disposed between the light guide member 310 and the display module DM. The light collection member 320 collects light provided from the light guide member 310 upward. Hereinafter, the light collection member 320 will be described in more detail with reference to FIGS. 4 to 8.

Although not shown, the backlight unit BLU may additionally include at least one optical sheet (not shown). The optical sheet (not shown) may be disposed above the light collection member 320. The optical sheet (not shown) may be a diffusion sheet or a protection sheet.

The reflection member 400 may be disposed below the light guide member 310. The reflection member 400 reflects the light emitted to a lower side of the light guide member 310 so that the light is emitted upward. The reflection member 400 includes a light reflecting material. In an exemplary embodiment, the reflection member 400 may include aluminum or silver, for example.

The accommodation member 500 may be disposed on the lowermost end of the display apparatus 1000 to accommodate the backlight unit BLU. The accommodation member 500 includes a bottom part 510 and a plurality of sidewalls 520 connected to the bottom part 510. According to an exemplary embodiment of the invention, the light source LS may be disposed on one inner surface of the plurality of sidewalls 520 of the accommodation member 500. The accommodation member 500 may include a metal having rigidity.

Figure 3:
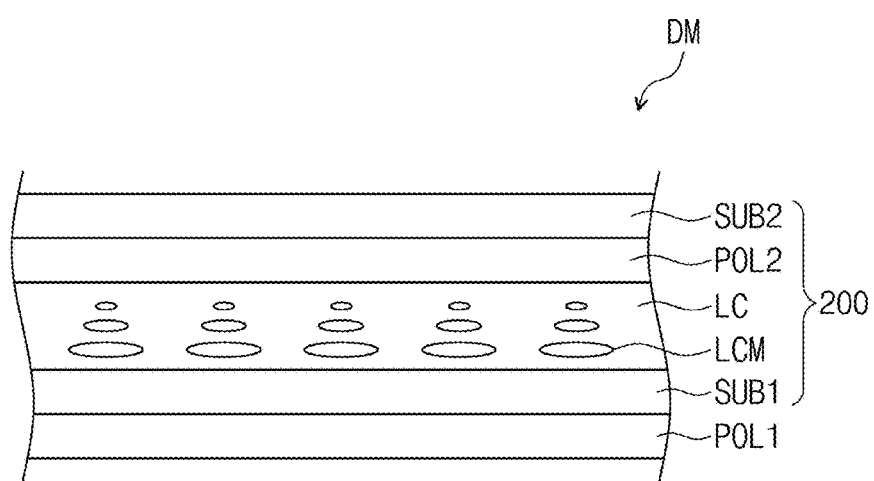
FIG. 3 is an enlarged cross-sectional view of a display module of FIG. 2.

FIG. 3 is an enlarged cross-sectional view of a display module of FIG. 2.

Referring to FIG. 3, a display module DM may include a polarization layer POL1 and a display panel 200. The first polarization layer POL1 is disposed between the display panel 200 and the backlight unit BLU (refer to FIG. 1) to polarize components of light provided from the backlight unit BLU. The first polarization layer POL1 may have a transmission axis (not shown) having a predetermined direction.

The display panel 200 may be disposed on the first polarization layer POL1 to display an image through the display area DA. The display panel 200 may be a light-receiving type display panel. In an exemplary embodiment of the invention, the display panel 200 may be a liquid crystal display panel, for example.

The display panel 200 includes a first substrate SUB1, a second polarization layer POL2, a second substrate SUB2, and a liquid crystal layer LC.

The first substrate SUB1 is disposed on the first polarization layer POL1 The first substrate SUB1 may include a material having high light transmissivity to easily transmit light provided from the backlight unit BLU. In an exemplary embodiment, the first substrate SUB1 may include a transparent glass substrate, a transparent plastic substrate, or a transparent film, for example.

Although not shown, at least one pixel area (not shown) and a non-pixel area (not shown) adjacent to the pixel area may be defined on the first substrate SUB1 in the plan view. In this exemplary embodiment, the pixel area may be provided in plural, and the non-pixel area may be defined between the pixel areas.

Pixels (not shown) may be disposed on the pixel areas of the first substrate SUB1, respectively. The pixels may include a plurality of pixel electrodes (not shown) and a plurality of thin film transistors ("TFTs") electrically connected to one-to-one correspond to the pixel electrodes. The TFTs may be respectively connected to the pixel electrodes to switch a driving signal provided to each of the pixel electrodes.

The second substrate SUB2 is disposed on the first substrate SUB1 to face the first substrate SUB1. A liquid crystal layer LC may be disposed between the second substrate SUB2 and the first substrate SUB1. The liquid crystal layer LC includes a plurality of liquid crystal molecules LCM arranged in a predetermined direction.

The second substrate SUB2 may include a common electrode (not shown) for generating electric fields, which control an arrangement of the liquid crystal molecules LCM together with the pixel electrodes. The display module DM drives the liquid crystal layer LC to display an image in an upward direction, i.e., in the third direction DR3.

Although not shown, a driving chip providing a driving signal to the display module DM, a tape carrier package on which the driving chip is disposed (e.g., mounted), and a printed circuit board electrically connected to the display panel 200 through the tape carrier package may be disposed on the display module DM.

The second polarization layer POL2 is disposed between the liquid crystal layer LC and the second substrate SUB2. However, the invention is not limited to the position of the second polarization layer POL2, which is illustrated in FIG. 3. In an exemplary embodiment, according to another exemplary embodiment of the invention, the second polarization layer POL2 may be disposed on the second substrate SUB2, for example.

In an exemplary embodiment, the second polarization layer POL2 may be a wire grid polarizer. Although not shown, the second polarization layer POL2 may include a plurality of nanowires including a metal material. However, the invention is not limited to a specific shape and material of the second polarization layer POL2.

The second polarization layer POL2 may have an absorption axis (not shown) having a predetermined direction. When a display mode of the display apparatus 1000 is in a bright state, the second polarization layer POL2 transmits light. When the display mode of the display apparatus 1000 is in a dark state, the second polarization layer POL2 absorbs light.

An angle defined by the transmission axis of the first polarization layer POL1 and the absorption layer of the second polarization layer POL2 may be determined according to the arrangement mode of the liquid crystal molecules LCM. In an exemplary embodiment, the transmission axis of the first polarization layer POL1 may be perpendicular to the absorption axis of the second polarization layer POL2 in the plan view, for example.

Figure 4:
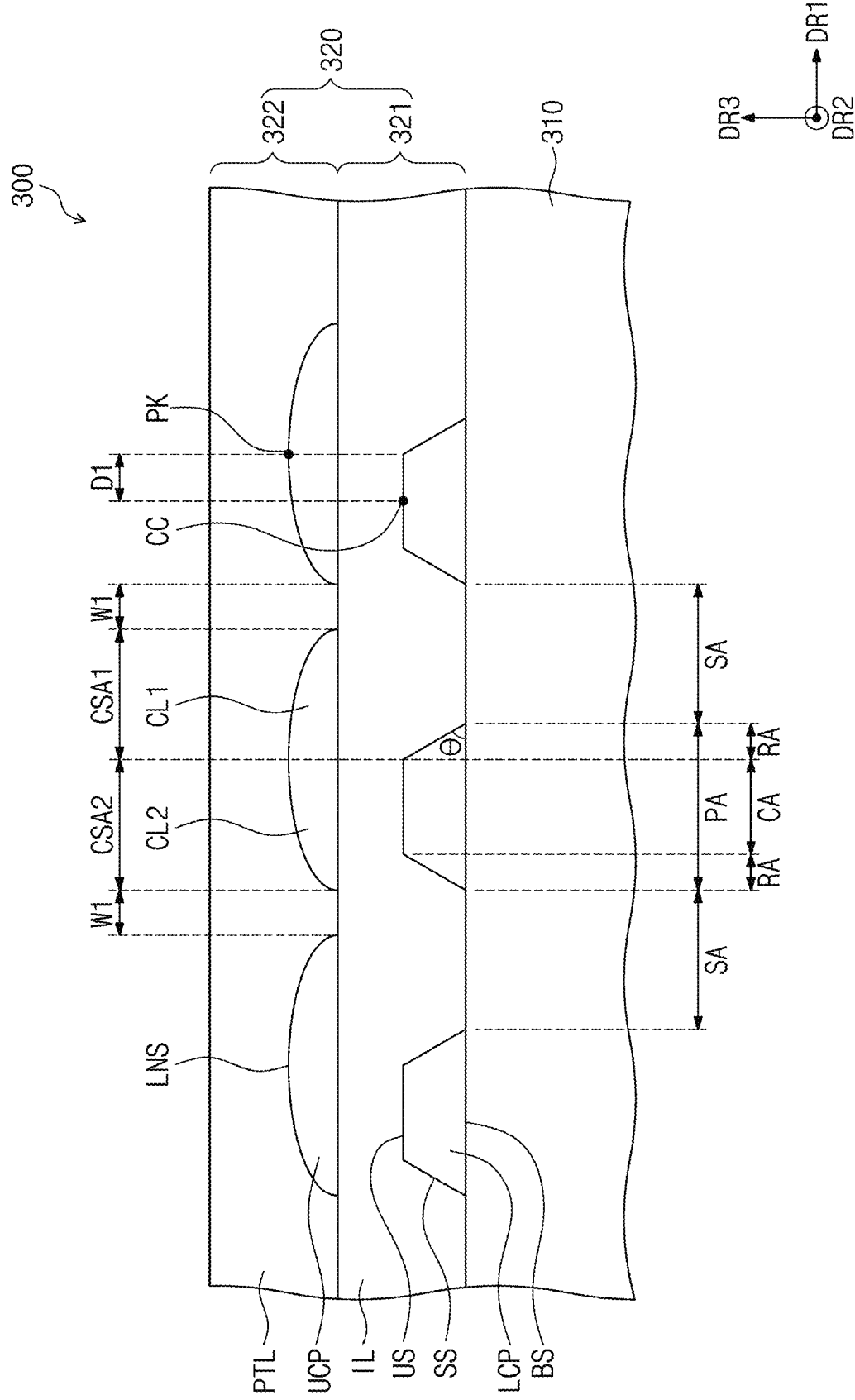
FIG. 4 is an enlarged cross-sectional view of an optical member of FIG. 1.
Figure 5:
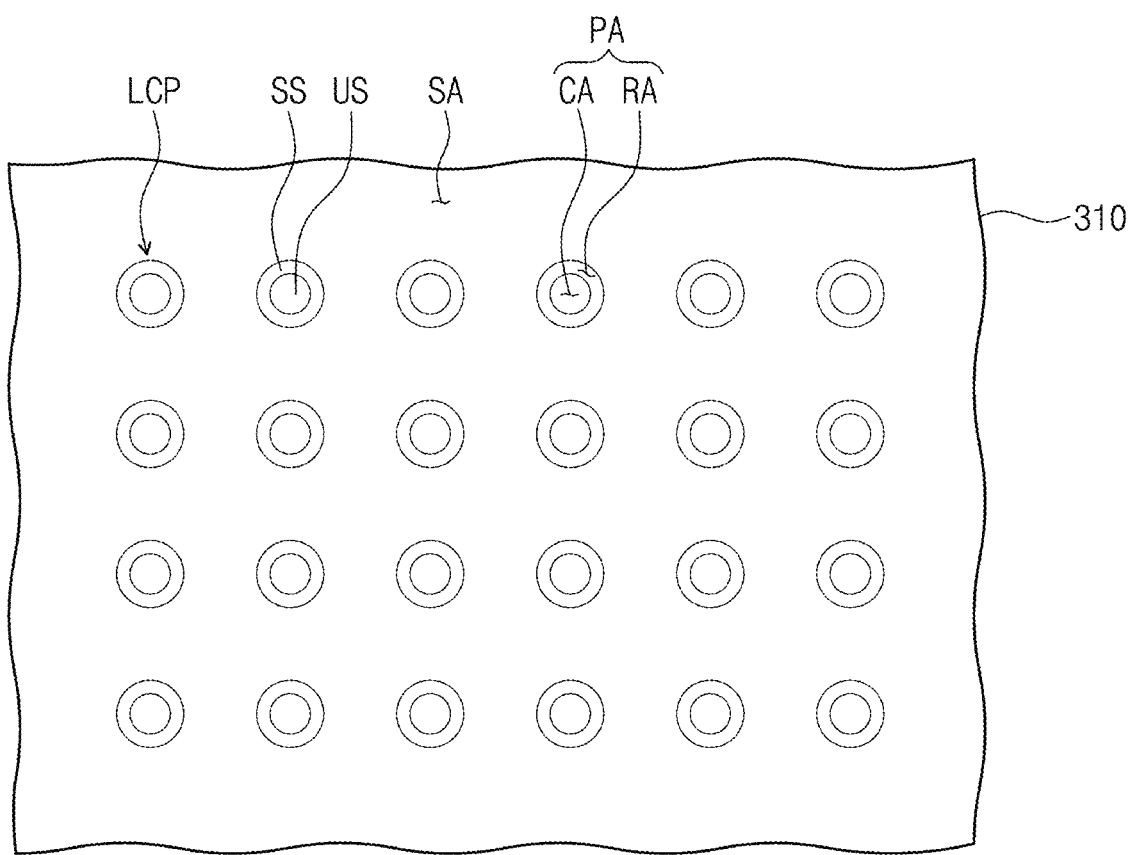
FIG. 5 is a front view of an exemplary embodiment of a lower light collection pattern according to the invention.
Figure 5:
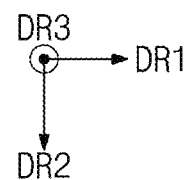
Figure 6:
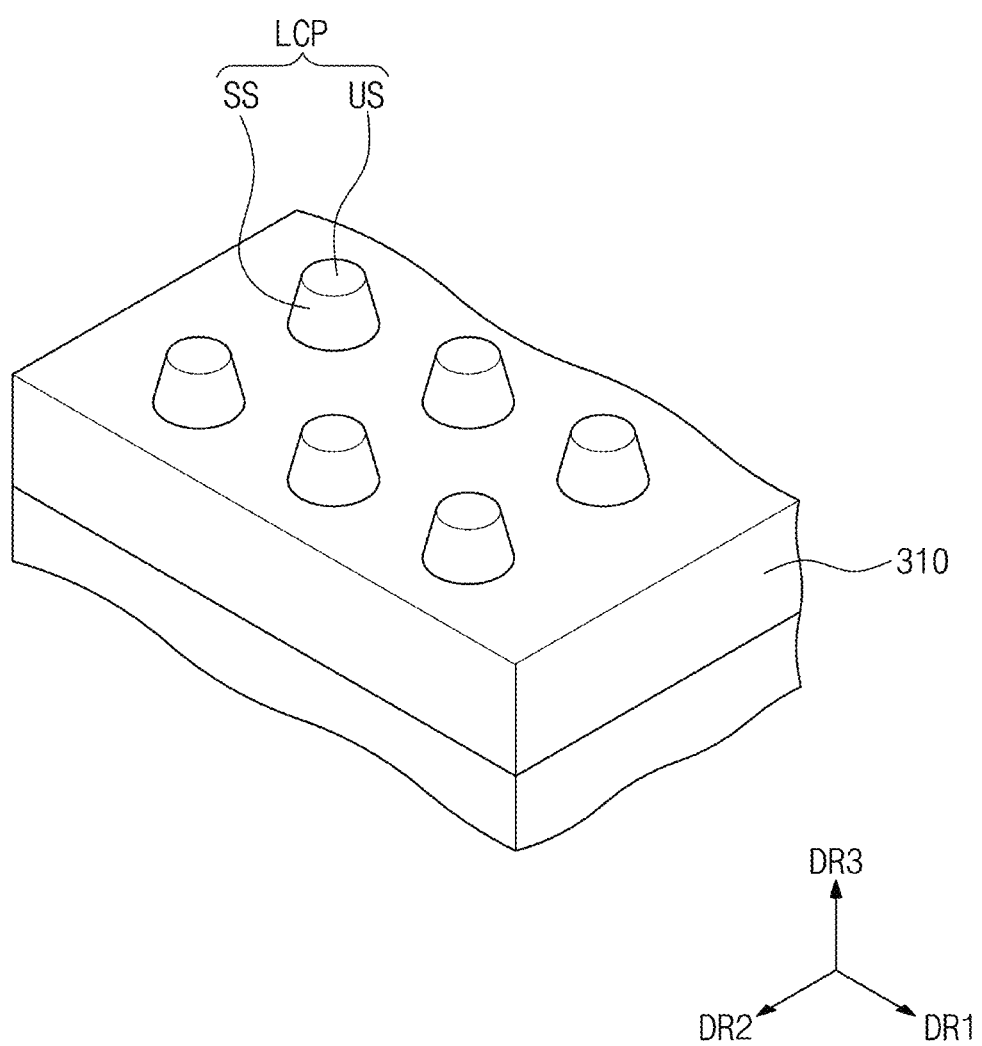
FIG. 6 is a perspective view of the lower light collection pattern of FIG. 5.

FIG. 4 is an enlarged cross-sectional view of the optical member of FIG. 1, FIG. 5 is a front view of a lower light collection pattern according to an exemplary embodiment of the invention, and FIG. 6 is a perspective view of the lower light collection pattern of FIG. 5. For convenience of description, only a portion of the optical member is illustrated in FIGS. 5 and 6.

Referring to FIG. 4, the light collection member 320 is disposed on the light guide member 310. The light collection member 320 includes a lower light collection layer 321 and an upper light collection layer 322 disposed on the lower light collection layer 321. The lower light collection layer 321 and the upper light collection layer 322 may be coupled to each other and thus be provided as one body.

Referring to FIGS. 5 and 6 together with FIG. 4, a plurality of pattern areas PA and a surrounding area SA are defined on a top surface (light emission surface) of the light guide member 310. In this exemplary embodiment, each of the pattern areas PA has a circular shape. In this exemplary embodiment, the pattern areas PA may be arranged in the form of a matrix on the light guide member 310. Particularly, the pattern areas PA may be arranged in the first direction DR1 and the second direction DR2. However, an exemplary embodiment of the invention is not specifically limited to the arranged shape of the pattern areas PA. According to another exemplary embodiment of the invention, the pattern areas PA may be irregularly arranged. In an exemplary embodiment, the pattern areas PA may gradually increase in density from the light incident surface to the opposite surface of the light guide member 310, for example.

Each of the pattern areas PA includes a central area CA and a ring area RA. In this exemplary embodiment, the central area CA is disposed at a center of the pattern areas PA and has a circular shape. The ring area RA has a ring shape surrounding the central area CA in the plan view.

The surrounding area SA is defined as an area on the light guide member 310 except for the pattern areas PA.

The lower light collection layer 321 includes a plurality of lower light collection patterns LCP and an intermediate layer IL. The lower light collection patterns LCP are disposed on the light guide member 310. The lower light collection patterns LCP are disposed to be spaced apart from each other. Each of the lower light collection patterns LCP overlaps each of the pattern area PA. The surrounding area SA may be exposed by the lower light collection patterns LCP. Each of the lower light collection patterns LCP may have a second refractive index n2. In this exemplary embodiment, the second refractive index n2 may be greater than the first refractive index n1. In an exemplary embodiment, the second refractive index n2 may be equal to or greater than about 1.8, for example.

In this exemplary embodiment, each of the lower light collection patterns LCP may include an organic material. However, the invention is not limited to the material of each of the lower light collection patterns LCP. In another exemplary embodiment of the invention, each of the lower light collection patterns LCP may include an inorganic material. In an exemplary embodiment, each of the lower light collection patterns LCP may include silicon nitride (SiNx), for example.

Each of the lower light collection patterns LCP may have a truncated cone shape. Particularly, each of the lower light collection patterns LCP includes a top surface US, a bottom surface BS, add a side surface SS. In this exemplary embodiment, each of the top surface US and the bottom surface BS has a circular shape in the plan view. The top surface US may entirely overlap the bottom surface BS in the plan view. The bottom surface BS has an area greater than that of the top surface US. The bottom surface BS contacts the light guide member 310.

The bottom surface BS may entirely overlap the pattern areas PA in the plan view. The top surface US may entirely overlap the central area CA in the plan view.

The side surface SS connects the top surface US to the bottom surface BS. The side surface SS may entirely overlap the ring area RA in the plan view. The side surface SS of the lower light collection pattern LCP has an inclined surface. That is, in the cross-section, the lower light collection pattern LCP may have a trapezoid shape. The side surface SS and the bottom surface BS has a first angle θ therebetween. In this exemplary embodiment, the first angle θ may range from about 50 degrees to about 90 degrees, for example.

The intermediate layer IL is disposed on the lower light collection patterns LCP to cover the lower light collection patterns LCP and the surrounding area SA of the light guide member 310. The intermediate layer IL may have a third refractive index n3. The third refractive index n3 is less than the first refractive index n1. That is, the third refractive index n3 is less than the second refractive index n2. In this exemplary embodiment, the third refractive index n3 may be less than about 1.5, for example.

Figure 7:
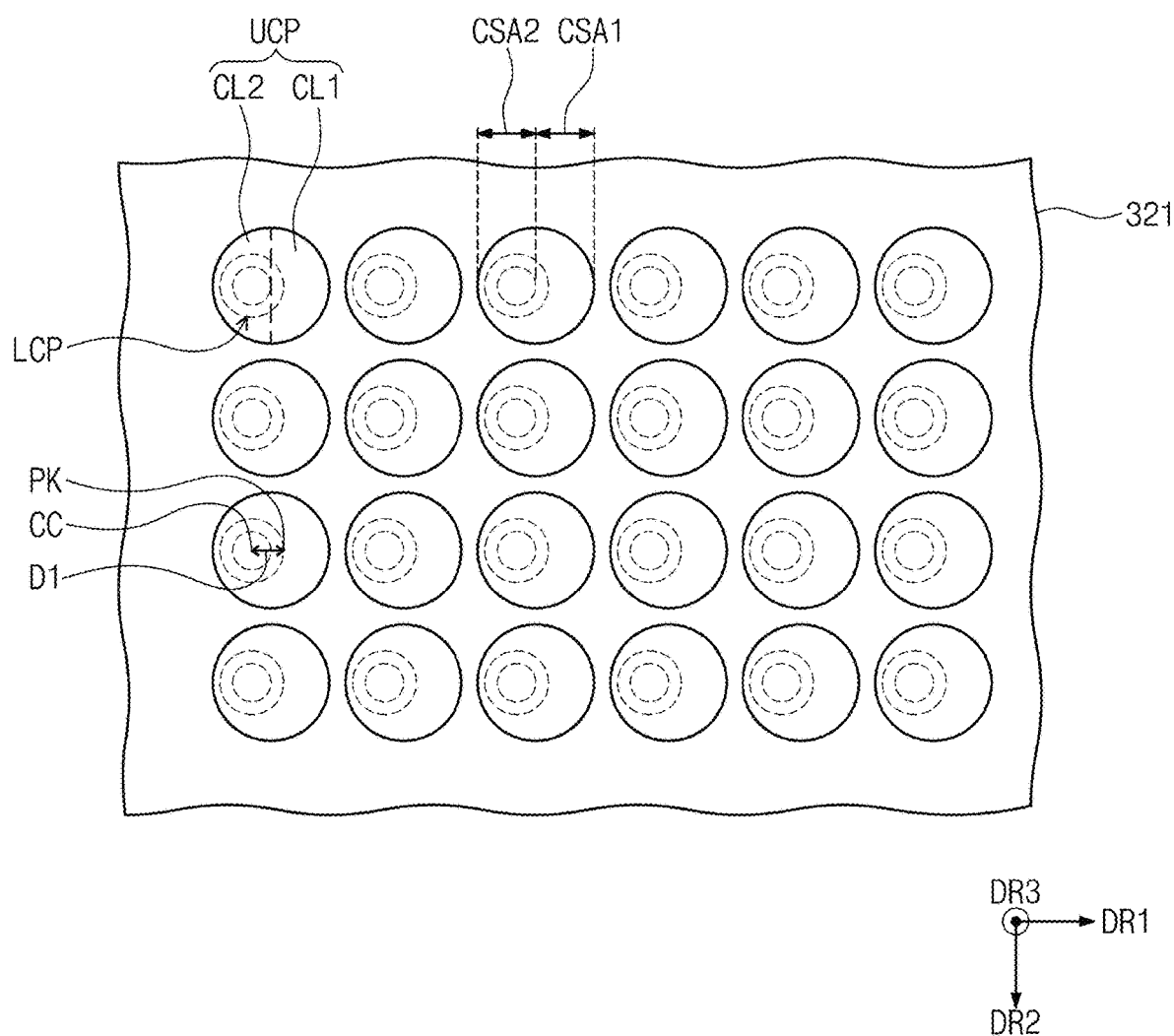
FIG. 7 is a front view of an exemplary embodiment of an upper light collection pattern according to the invention.

FIG. 7 is a front view of the upper light collection pattern according to an exemplary embodiment of the invention.

Referring to FIG. 7 together with FIG. 4, the upper light collection layer 322 includes a plurality of upper light collection patterns UCP and a protection layer PTL.

The upper light collection patterns UCP are disposed on the intermediate layer IL. The upper light collection patterns UCP may be disposed to be spaced apart from each other.

Thus, a portion of the intermediate layer IL may be exposed between the upper light collection patterns UCP in the plan view.

Each of the upper light collection patterns UCP has a third refractive index n3. That is, the upper light collection pattern UCP has the same refractive index as that of the intermediate layer IL.

Each of the upper light collection patterns UCP includes a first portion CL1 and a second portion CL2. The first portion CL1 may be disposed closer to the opposite surface than the second portion CL2 is to the opposite surface in the first direction DR1. The first portion CL1 and the second portion CL2 may have a unitary shape.

Each of the upper light collection patterns UCP may have a top surface LNS having a curved shape that protrudes upward. The top surface LNS of each of the upper light collection patterns UCP has a peak point PK. Each of the upper light collection patterns UCP may have a maximum thickness at the peak point PK on the plane.

The top surface LNS of each of the upper light collection patterns UCP has a first curved area CSA1 and a second curved area CSA2. Particularly, the first curved area CSA1 may be defined on a top surface of the first portion CL1, and the second curved area CSA2 may be defined on a top surface of the second portion CL2. The top surface of the first portion CL1 on the first curved area CSA1 may be inclined from the peak point PK to the opposite surface of the light guide member 310. The top surface of the second portion CL2 on the second curved area CSA2 may be inclined from the peak point PK to the light incident surface of the light guide member 310.

Each of the upper light collection patterns UCP has a circular shape in the plan view. Thus, in this exemplary embodiment, the peak point PK of the upper light collection pattern UCP may correspond to a center of the upper light collection pattern UCP.

In this exemplary embodiment, the first portion CL1 and the second portion CL2 may have shapes that are symmetrical to each other in cross-section with respect to an axis passing through the peak point PK and parallel to the third direction DR3. However, an exemplary embodiment of the invention is not limited thereto. In another exemplary embodiment of the invention, the top surfaces of the first portion CL1 and the second portion CL2 may have curvatures different from each other, for example.

According to this exemplary embodiment, the upper light collection pattern UCP may entirely overlap the lower light collection pattern LCP in the plan view. The upper light collection pattern UCP may have an area greater than that of the lower light collection pattern LCP in the plan view.

According to this exemplary embodiment, the lower light collection pattern LCP may be biasedly disposed from the center of the upper light collection pattern UCP in a direction from the opposite surface to the light incident surface on the plane.

Particularly, a center CC of the top surface US of the lower light collection pattern LCP may be spaced apart with a first distance D1 from the peak point PK of the upper light collection pattern UCP in the direction from the opposite surface to the light incident surface. The first distance D1 may be less than that between a point that is closest to the opposite surface on the top surface US and the center CC of the top surface US. In this exemplary embodiment, the first distance D1 may be less than a size of a radius of the top surface US. Thus, the first curved area CSA1 of the upper light collection pattern UCP overlaps at least a portion of the side surface SS of the lower light collection pattern LCP.

The overlapping portion of the side surface SS of the lower light collection pattern LCP may be inclined from the top surface US to the opposite surface of the light guide member 310 in the plan view. Thus, the product of an inclination angle defining an imaginary line of the overlapping portion of the side surface SS and an inclination angle defining another imaginary line of the first curved area CSA1 of the upper light collection pattern UCP may have a positive number.

A distance between the upper light collection patterns UCP may have a first width W1 in the first direction DR1. In this exemplary embodiment, the first width W1 may increase as the distance between the lower light collection patterns LCP increases. Also, the first width W1 may increase as the intermediate layer IL increases in thickness.

The protection layer PTL is disposed above the upper light collection patterns UCP to cover the upper light collection patterns UCP and a portion of the intermediate layer IL exposed by the upper light collection patterns UCP. The protection layer PTL may have a third refractive index n4. The fourth refractive index n4 is greater than the third refractive index n3. In an exemplary embodiment, the fourth refractive index n4 may range from about 1.5 to about 1.7, for example.

In another exemplary embodiment of the invention, the protection layer PTL may be omitted.

Figure 8:
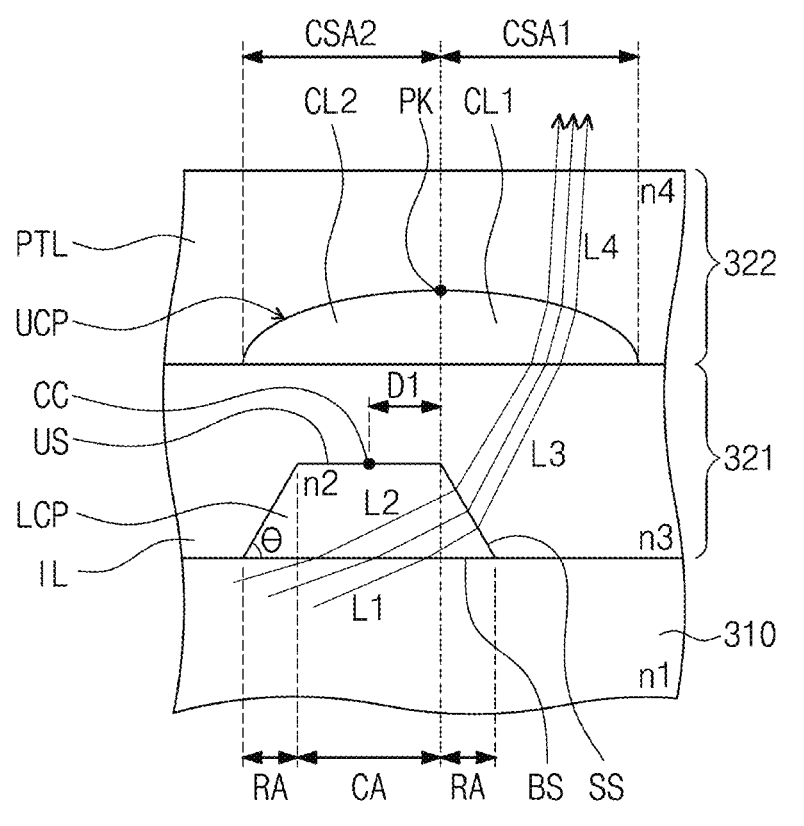
FIG. 8 is a view illustrating an exemplary embodiment of a path of light incident into a light collection member according to the invention.

FIG. 8 is a view illustrating a path of light incident into the light collection member according to an exemplary embodiment of the invention.

Referring to FIG. 8, light L1 is incident from the light guide member 310 to the lower light collection layer 321. The light L1 provided from the light source LS to the light incident surface of the light guide member 310 may be reflected by the bottom surface of the light guide member 310 and then incident into the lower light collection pattern LCP of the lower light collection layer 321. The light incident into the lower light collection pattern LCP may be refracted by a difference between the first refractive index n1 of the light guide member 310 and the second refractive index n2 of the lower light collection pattern LCP. A traveling direction of the refracted light L2 is closer to the third direction DR3 than the traveling direction of the light L1 is to the third direction DR3 before being incident into the lower light collection pattern LCP. That is, when the light is incident from the light guide member 310 to the lower light collection pattern LCP, the light is refracted in a direction that is close to a normal direction of the top surface of the light guide member 310.

Light L2 incident into the lower light collection pattern LCP passes through the lower light collection pattern LCP and then is incident into the intermediate layer IL through at least a portion of the side surface SS of the lower light collection pattern LCP. The portion of the side surface SS may be defined as one area that is close to the opposite surface with respect to the center of the lower light collection pattern LCP.

The bottom surface BS of the lower light collection pattern LCP has a first angle θ with respect to the side surface SS, and the first angle θ is set so that the light incident into the side surface SS passes through the side surface SS.

Particularly, an angle between the inclined side surface SS and the light L2 passing through the side surface SS may be less than a critical angle. The critical angle is defined as a minimum value of an angle between a normal line of the side surface SS, by which the light incident into the side surface SS is totally reflected, and the incident light. That is, when light having an angle greater than the critical angle is incident into the side surface SS, the incident light may be totally reflected. Thus, the first angle θ between the side surface SS and the bottom surface BS may be set so that the light L2 passing through the side surface SS is incident into the side surface SS at an angle less than the critical angle.

Light L3 passing through the side surface SS and incident into the intermediate layer IL is refracted by a difference between the second refractive index n2 of the lower light collection pattern LCP and the third refractive index n3 of the intermediate layer IL. A traveling direction of the refracted light L3 is closer to the third direction DR3 than the traveling direction of the light L2 is to the third direction DR3 before being incident into the intermediate layer IL. That is, when the light is incident from the lower light collection pattern LCP to the incident layer IL, the light is refracted in a direction that is away from the normal direction of the side surface SS.

The refracted light L3 may be incident into the upper light collection pattern UCP of the upper light collection layer 322. The light L3 incident into the upper light collection pattern UCP passes through the first portion CL1 of the upper light collection pattern UCP. The light L3 passing through the first portion CL1 is refracted by the curved shape of the top surface of the first portion CL1, which overlaps the first curved area CSA1 and then incident into the protection layer PTL. A traveling direction of the refracted light L4 is closer to the third direction DR3 than the traveling direction of the light L3 is to the third direction DR3 before being incident into the protection layer PTL.

The first angle θ may vary according to the thickness of the intermediate layer IL and the shape of the upper light collection pattern UCP.

The more the first angle θ of the side surface SS of the lower light collection pattern LCP decreases, the more a refracted degree of the refracted light L3 may decrease. That is, as the first angle θ decreases, the traveling direction of the refracted light L3 may not be close to the third direction DR3. In this case, to increase a refracted degree of the light L4, which is refracted by the upper light collection pattern UCP, the upper light collection pattern UCP may increase in width and curvature radius. That is, the first curved area CSA1 may increase in width and curvature radius.

According to this exemplary embodiment, since light generated from the light source LS travels in a direction from the light incident surface to the opposite surface of the light guide member 310, an amount of light incident into an area, which is adjacent to the opposite surface, of the side surface SS of the lower light collection pattern LCP may be greater than that of light incident into an area, which is adjacent to the light incident surface, of the side surface SS of the lower light collection pattern LCP.

According to this exemplary embodiment, the center CC of the top surface US of the lower light collection pattern LCP is spaced apart from the peak point PK of the upper light collection pattern UCP in a direction from the opposite surface to the light incident surface. That is, the lower light collection pattern LCP may be disposed biased from the peak point PK of the upper light collection pattern UCP in the direction from the opposite surface to the light incident surface. Thus, the light may be emitted to an area, which is adjacent to the opposite surface, of the side surface SS of the lower light collection pattern LCP, and thus, the amount of light incident into the first portion CL1 of the upper light collection pattern UCP may increase. That is, the light collection member 320 may be improved in light collection efficiency.

Figure 9:
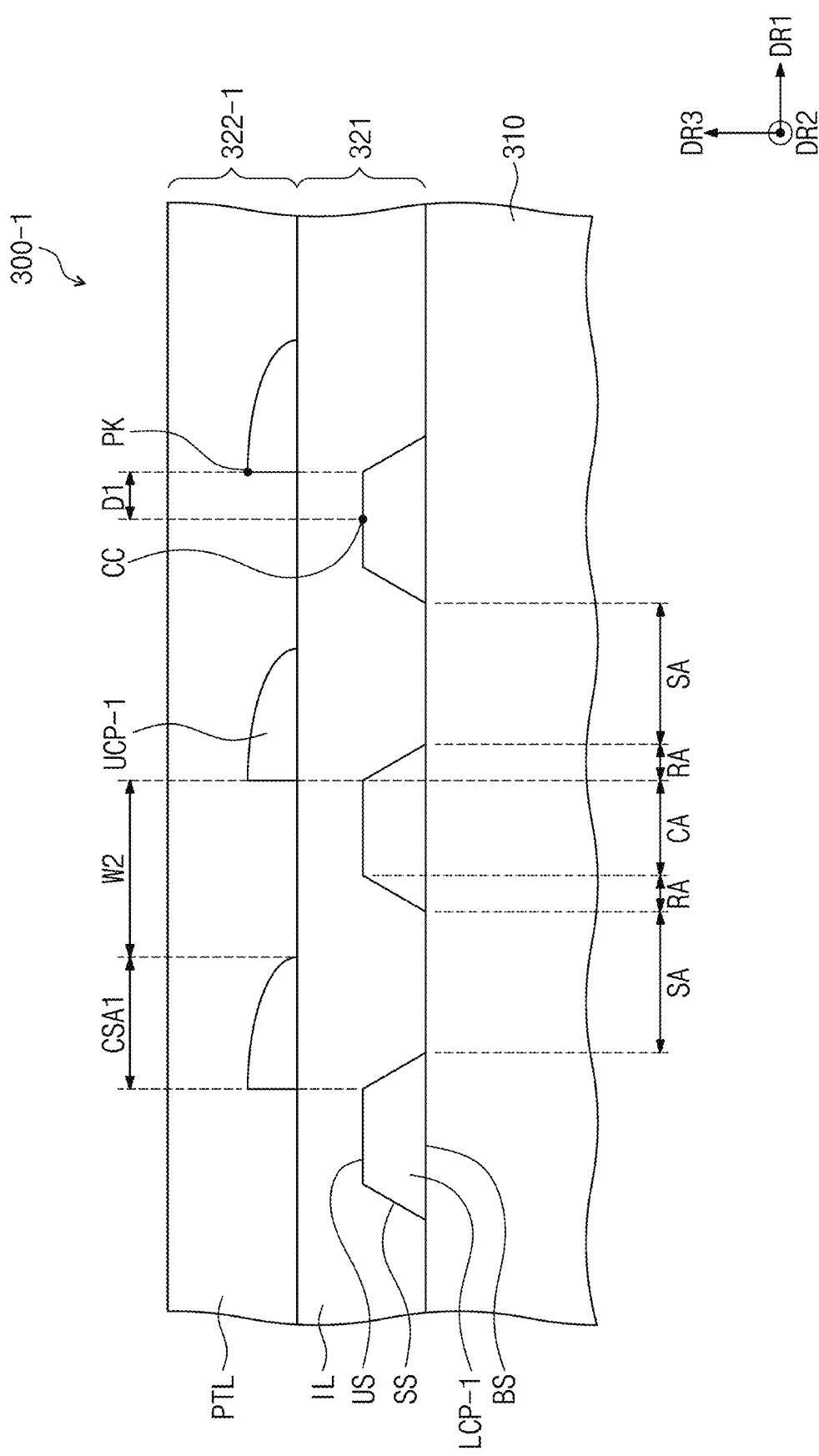
FIG. 9 is an enlarged cross-sectional view of another exemplary embodiment of an optical member according to the invention.
Figure 10:
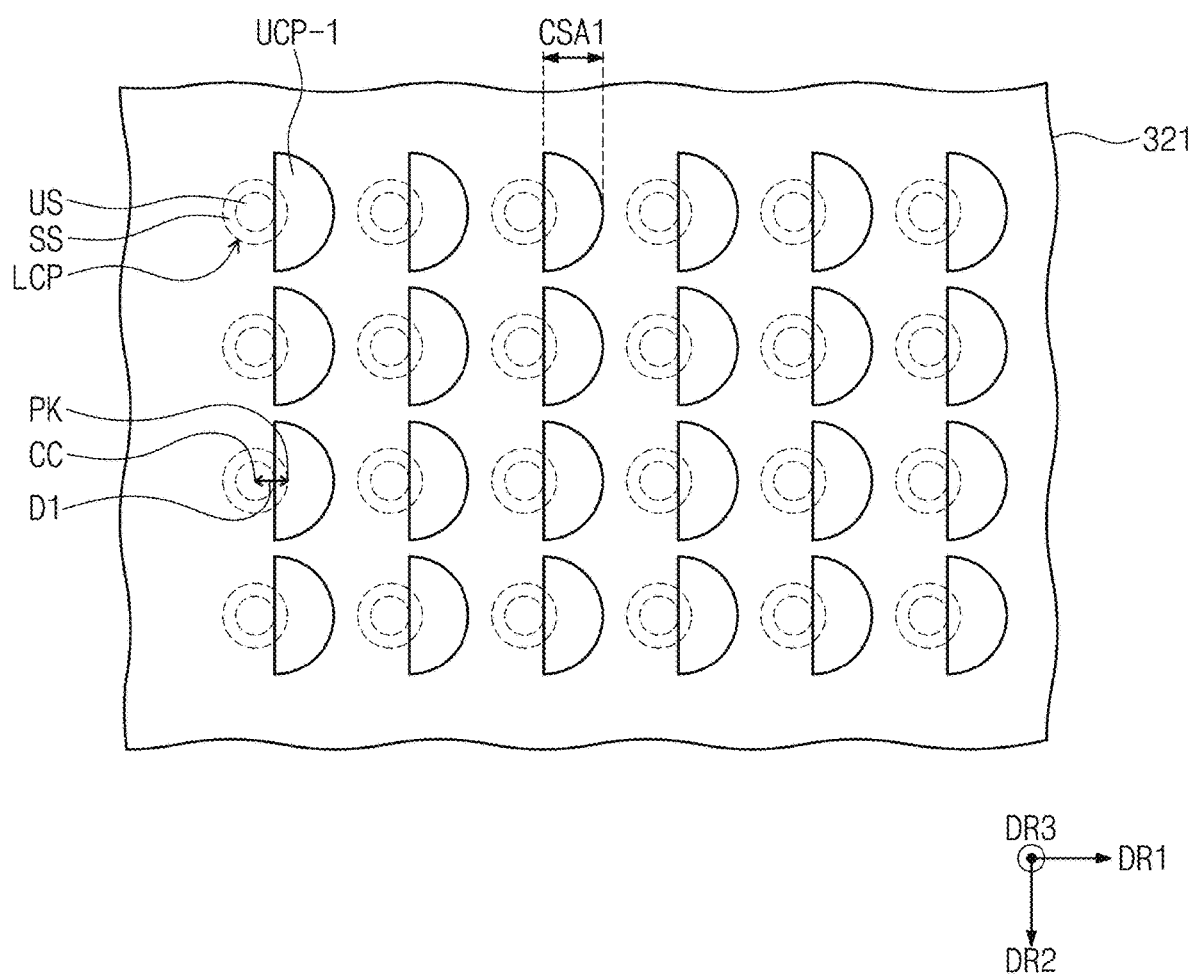
FIG. 10 is a front view of an upper light collection pattern of FIG. 9.

FIG. 9 is an enlarged cross-sectional view of an optical member according to another exemplary embodiment of the invention, and FIG. 10 is a front view of an upper light collection pattern of FIG. 9.

For convenience of description, differences between this exemplary embodiment and the foregoing embodiment will be mainly described, and omitted descriptions will be derived from the foregoing embodiment. Also, the same reference symbol is given to the same component, and duplicated descriptions with respect to the component will be omitted.

Referring to FIGS. 9 and 10, an upper light collection layer 322-1 of an optical member 300-1 according to another exemplary embodiment of the invention includes upper light collection patterns UCP-1 and a protection layer PTL.

Only a first curved area CSA1 is defined on a top surface LNS (refer to FIG. 4) of each of the upper light collection patterns UCP-1. The upper light collection pattern UCP-1 according to this exemplary embodiment includes only the above-described first portion CL1 (refer to FIG. 8). That is, the upper light collection pattern UCP-1 does not include the second portion CL2 (refer to FIG. 8).

According to this exemplary embodiment, each of the upper light collection patterns UCP-1 has a peak point PK at a center of an edge adjacent to a light incident surface in the first direction DR1. The peak point PK may be spaced apart with a first distance D1 from a center CC of a top surface US of each of lower light collection patterns LCP-1. In this exemplary embodiment, each of the upper light collection patterns UCP-1 has a semicircular shape in a plan view. A center of the semicircle may overlap the peak point PK in the plan view.

A distance between the upper light collection patterns UCP-1 may have a second width W2 in the first direction DR1. In this exemplary embodiment, the second width W2 is greater than the first width W1.

Figure 11:
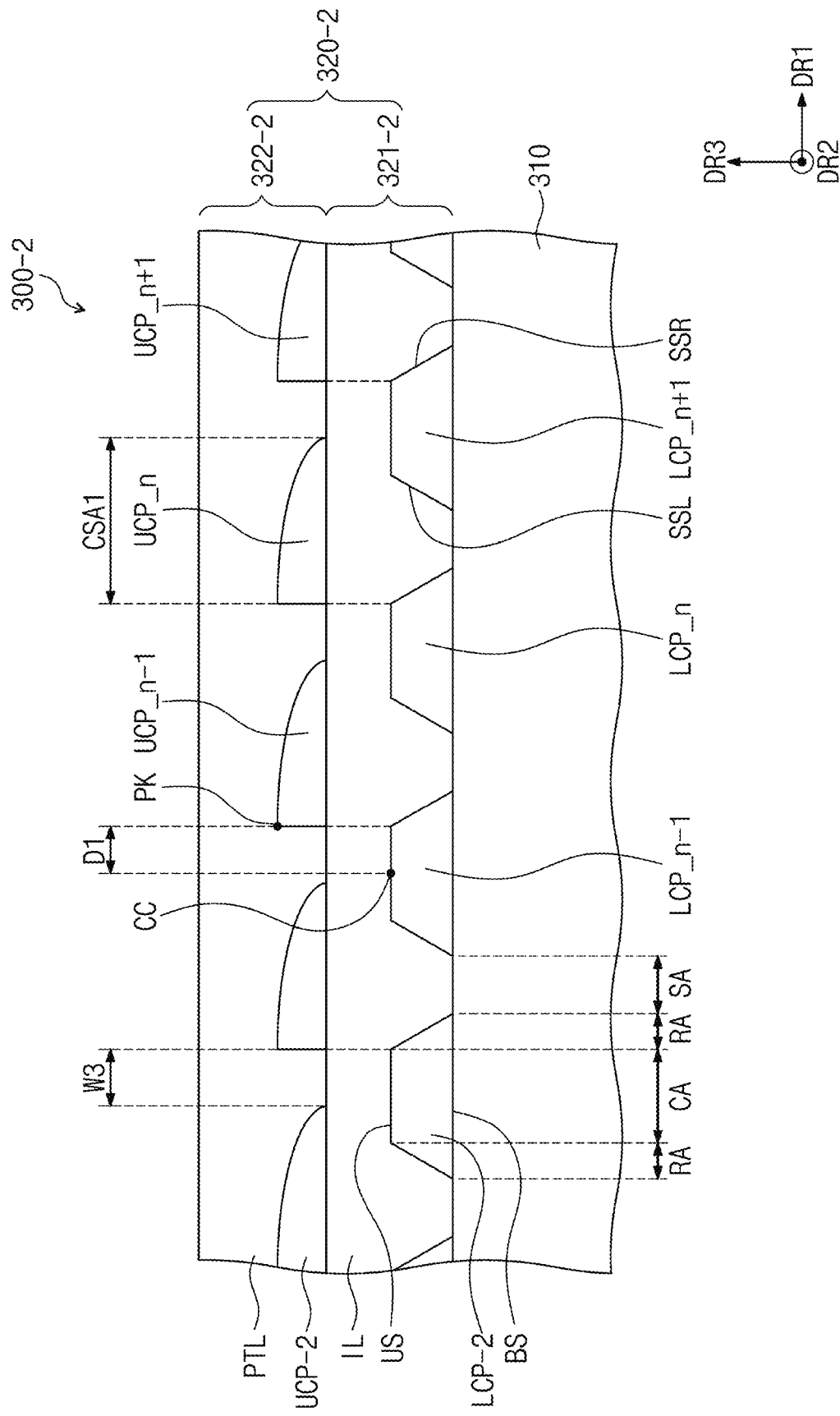
FIG. 11 is an enlarged cross-sectional view of another exemplary embodiment of an optical member according to the invention.

FIG. 11 is an enlarged cross-sectional view of an optical member according to another exemplary embodiment of the invention.

For convenience of description, differences between this exemplary embodiment and the foregoing embodiment will be mainly described, and omitted descriptions will be derived from the foregoing embodiment. Also, the same reference symbol is given to the same component, and duplicated descriptions with respect to the component will be omitted.

Referring to FIG. 11, according to another exemplary embodiment of the invention, each of the lower light collection patterns LCP-2 may overlap at least two upper light collection patterns UCP-2.

Particularly, an n-th upper light collection pattern UCP_n of the upper light collection patterns UCP-2 arranged in the first direction DR1 may overlap a portion of an n-th upper light collection pattern UCP_n and a portion of an (n+1)-th lower light collection pattern LCP_n+1 of the lower light collection patterns LCP-2 arranged in the first direction DR1. Here, the n-th upper light collection pattern UCP_n may overlap an area SSR, which is adjacent to an opposite surface, with respect to a center CC of an area of a side surface SS of the n-th lower light collection pattern LCP_n and an area SSL, which is adjacent to a light incident surface, with respect to the center CC of an area of the side surface SS of the (n+1)-th lower light collection pattern LCP_n+1.

In this exemplary embodiment, the upper light collection pattern UCP-2 may have the same shape as that of the upper light collection pattern UCP-1 of FIGS. 9 and 10. However, and embodiment of the invention is not limited thereto. In an exemplary embodiment, the upper light collection pattern UCP-2 may include the second portion CL2 (refer to FIG. 8), for example.

According to this exemplary embodiment, a distance between the lower light collection patterns LCP-2 and a distance W3 between the upper light collection patterns UCP-2 may be reduced. That is, an amount of light incident into the lower light collection patterns LCP-2 may increase. Thus, the light collection member 320-2 of an optical member 300-2 including the lower and upper light collection layer 321-2 and 322-2 may be improved in light collection efficiency.

Figure 12:
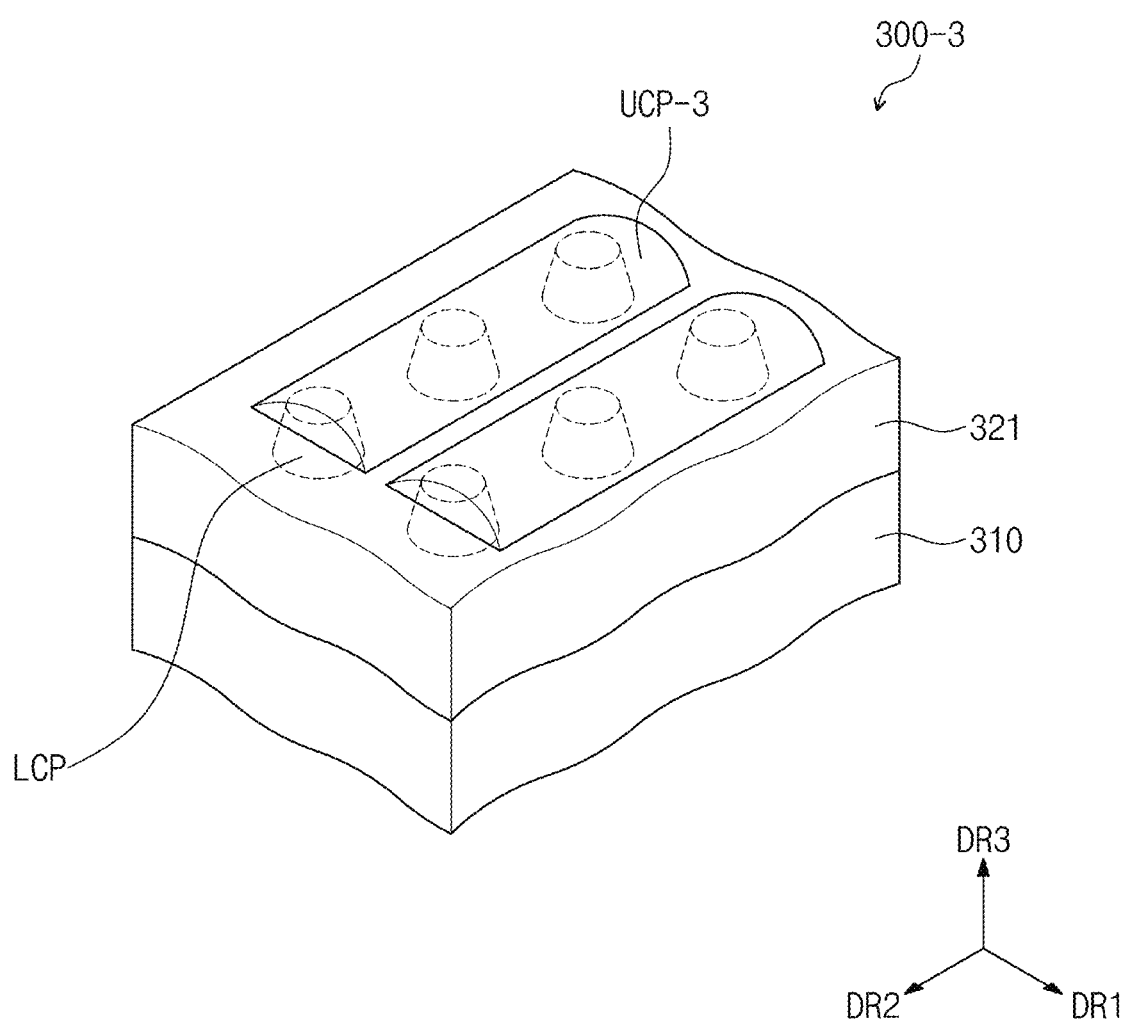
FIG. 12 is a perspective view of another exemplary embodiment of an optical member according to the invention.
Figure 13:
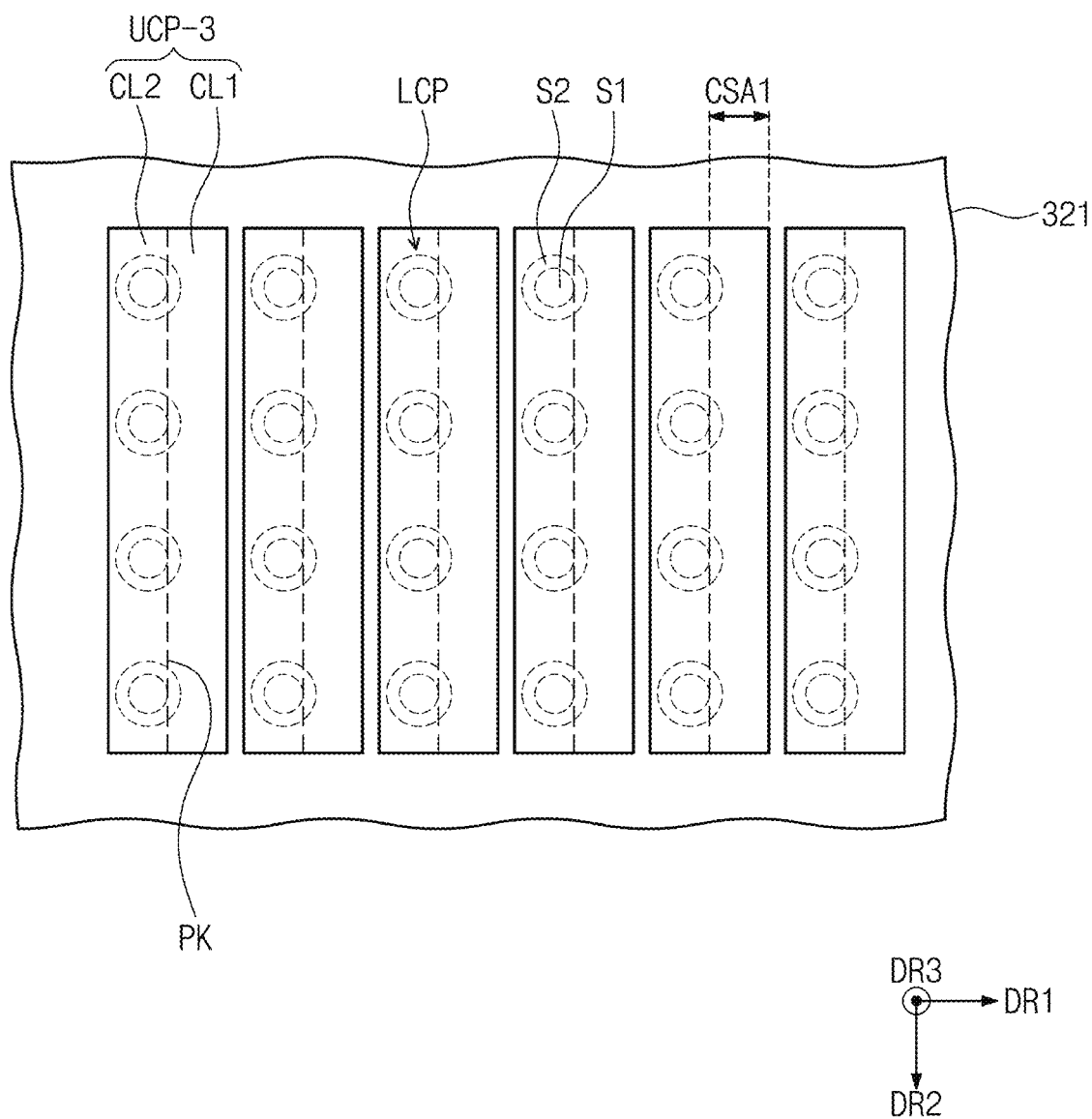
FIG. 13 is a front view of an upper light collection pattern of FIG. 12.

FIG. 12 is a perspective view of an optical member according to another exemplary embodiment of the invention, and FIG. 13 is a front view of an upper light collection pattern of FIG. 12.

For convenience of description, differences between this exemplary embodiment and the foregoing embodiment will be mainly described, and omitted descriptions will be derived from the foregoing embodiment. Also, the same reference symbol is given to the same component, and duplicated descriptions with respect to the component will be omitted.

Also, for convenience of description, a protection layer PTL (e.g., refer to FIG. 4) is omitted in FIGS. 12 and 13.

Referring to FIGS. 12 and 13, upper light collection patterns UCP-3 of an optical member 300-3 according to another exemplary embodiment of the invention has a rectangular shape in a plan view. Particularly, the upper light collection patterns UCP-3 has a rectangular shape with a long side in the second direction DR2 on the plane.

According to this exemplary embodiment, the upper light collection patterns UCP-3 may overlap a plurality of lower light collection patterns LCP, respectively. The overlapping lower light collection patterns LCP are arranged in the second direction DR2.

Each of the upper light collection patterns UCP-3 may have a top surface having a curved shape that protrudes upward. The top surface of each of the upper light collection patterns UCP-3 has a peak point PK. The peak point PK has a line shape extending in the second direction DR2 in the plan view.

Hereinafter, since arranged configurations of the upper light collection patterns UCP-3 and the lower light collection patterns LCP in cross-section are the same as those according to the foregoing embodiments, their descriptions will be omitted.

Figure 14:
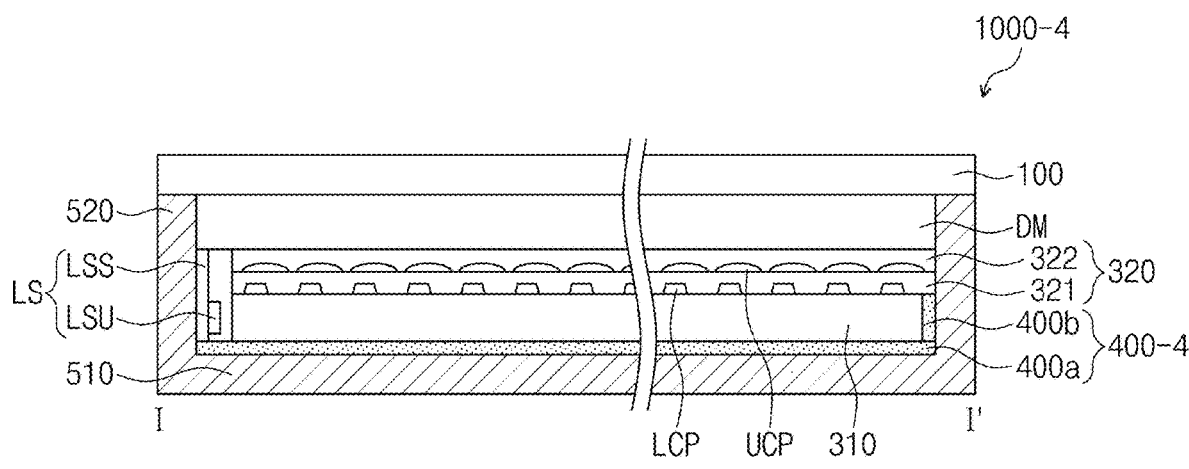
FIG. 14 is a cross-sectional view of another exemplary embodiment of a display apparatus according to the invention.
Figure 14:
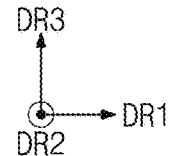

FIG. 14 is a cross-sectional view of a display apparatus according to another exemplary embodiment of the invention.

For convenience of description, differences between this exemplary embodiment and the foregoing embodiment will be mainly described, and omitted descriptions will be derived from the foregoing embodiment. Also, the same reference symbol is given to the same component, and duplicated descriptions with respect to the component will be omitted.

Referring to FIG. 14, in a display apparatus 1000-4 according to another exemplary embodiment of the invention, a reflection member 400-4 includes a first reflection member 400a and a second reflection member 400b. The first reflection member 400a is disposed on a bottom surface of a light guide member 310. The second reflection member 400b is disposed on an opposite surface of the light guide member 310. That is, the second reflection member 400b faces a light source LS in the first direction DR1.

According to this exemplary embodiment, light incident into the opposite surface of the light guide member 310 is reflected by the second reflection member 400b and then emitted in a direction from the opposite surface to a light incident surface. The emitted light may be collected by a lower light collection pattern LCP of a lower light collection layer 321. That is, the display apparatus 1000-4 may be improved in light utilization efficiency.

Figure 15:
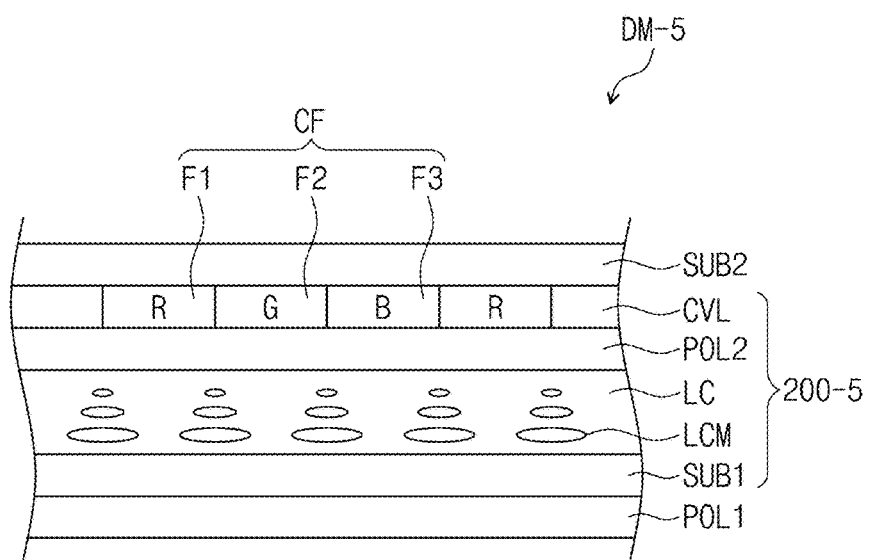
FIG. 15 is an enlarged cross-sectional view of another exemplary embodiment of a display module according to the invention.

FIG. 15 is an enlarged cross-sectional view of a display module according to another exemplary embodiment of the invention.

For convenience of description, differences between this exemplary embodiment and the foregoing embodiment will be mainly described, and omitted descriptions will be derived from the foregoing embodiment. Also, the same reference symbol is given to the same component, and duplicated descriptions with respect to the component will be omitted.

Referring to FIG. 15, a display panel 200-5 of a display module DM-5 according to another exemplary embodiment of the invention further includes a light conversion layer CVL. The light conversion layer CVL is disposed between a second polarization layer POL2 and a second substrate SUB2.

The light conversion layer CVL includes a plurality of conversion filters CF. The light conversion filters CF may convert a color of light incident into the light conversion layer CVL or transmit the light as it is. The incident light may be realized as an image with various colors by the light conversion layer CVL.

Each of the conversion filters CF may include a plurality of light conversion particles. Each of the light conversion particles may absorb at least a portion of the incident light to emit light having a special color or transmit the light as it is.

When light incident into the light conversion filters CF has sufficient energy for exciting the light conversion particles, the light conversion particles may absorb at least a portion of the incident light and then be excited and stabilized to emit light having a special color. When the incident light has energy that is difficult to excite the light conversion particles, the incident light may transmit the light conversion filters CF as it is and thus be seen from the outside.

Particularly, light emitted by the light conversion particles may be determined in color according to a size of each of the light conversion particles. Substantially, as each of the particles increases, light having a longer wavelength is generated. Also, as each of the particles decreases, light having a shorter wavelength is generated.

According to this exemplary embodiment, each of the light conversion particles may be a quantum dot. Light emitted from the light conversion particles of the light conversion filters CF may be emitted in various directions.

According to an exemplary embodiment of the invention, each of the light conversion filters CF includes a first conversion filter F1, a second conversion filter F2, and a third conversion filter F3. Although not shown, a black matrix may be disposed between the first to third conversion filters F1 to F3 to define boundaries between the first to third conversion filters F1 to F3.

The first conversion filter F1 and the second conversion filter F2 convert light incident into the light conversion layers CV into light having wavelength bands different from each other.

Although not shown, the light source LS (refer to FIG. 1) according to this exemplary embodiment may generate first light. In an exemplary embodiment, the first light may have a wavelength band of about 400 nanometers (nm) to about 500 nm, for example. That is, the light source LS may substantially generate blue light.

The first conversion filter F1 may absorb the first light to convert the first light into second light. In an exemplary embodiment, the second light may have a wavelength band of about 640 nm to about 780 nm, for example. That is, the first conversion filter F1 may substantially convert the blue light into red light.

The second conversion filter F2 may absorb the first light to convert the first light into third light. In an exemplary embodiment, the third light may have a wavelength band of about 480 nm to about 560 nm, for example. That is, the second conversion filter F2 may substantially convert the blue light into green light.

The third conversion filter F3 may be a colorless filter or a gray filter. When light source units LSU of the light source LS generate light having a blue color, the third conversion filter F3 may transmit incident light as it is without converting a color of the incident light. Here, when the third conversion filter F3 is capable of transmitting at least a portion of light incident into the third conversion filter F3, the third conversion filter F3 may include various materials, and also, the invention is not limited to the materials.

As described above, generated light may be determined in wavelength by the quantum dots. According to this exemplary embodiment, the first conversion filter F1 may include first quantum dots, and the second conversion filter F2 may include second quantum dots. The third conversion filter F3 may include third quantum dots. According to this exemplary embodiment, each of the first quantum dots may have a size greater than that of each of the second quantum dots. Each of the second quantum dots has a size greater than that of each of the third quantum dots. According to another exemplary embodiment of the invention, the third conversion filter F3 does not need to include the third quantum dots.

Figure 16:
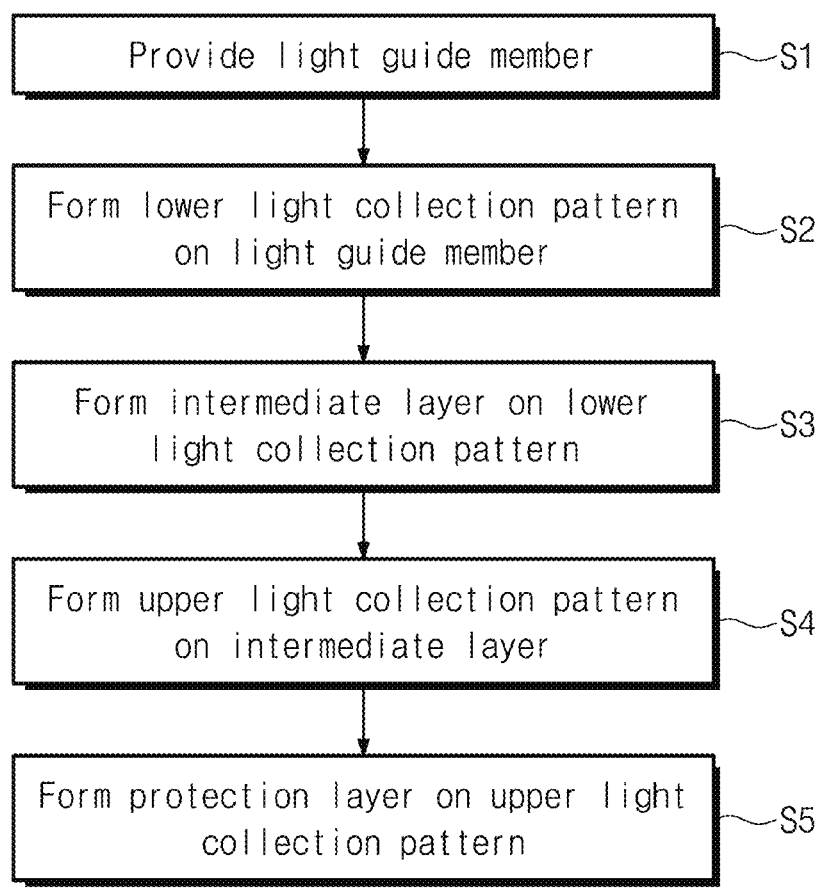
FIG. 16 is a flowchart illustrating an exemplary embodiment of a method for manufacturing the display apparatus according to the invention.

FIG. 16 is a flowchart illustrating a method for manufacturing the display apparatus according to an exemplary embodiment of the invention, and FIGS. 17A to 17F are views illustrating a process of manufacturing the optical member according to an exemplary embodiment of the invention.

For convenience of description, differences between this exemplary embodiment and the foregoing embodiment will be mainly described, and omitted descriptions will be derived from the foregoing embodiment. Also, the same reference symbol is given to the same component, and duplicated descriptions with respect to the component will be omitted.

Figure 17A:
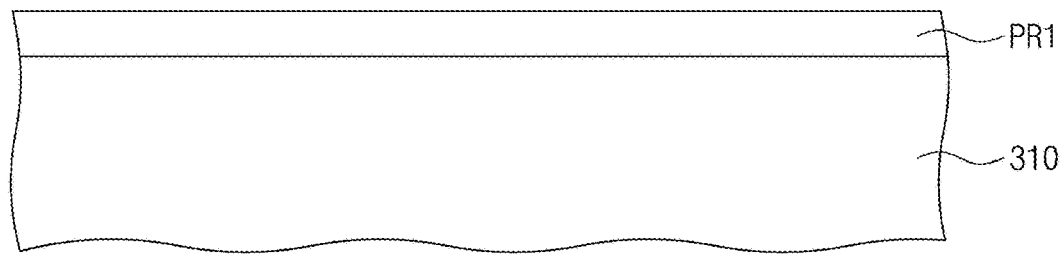
FIGS. 17A to 17F are views illustrating an exemplary embodiment of a process of manufacturing the optical member according to the invention.

Referring to FIGS. 16 and 17A, to manufacturing an optical member according to an exemplary embodiment of the invention, a first preliminary pattern layer RP1 is disposed on a light guide member 310 (51). The first preliminary pattern layer PR1 may be applied to the light guide member 310. The first preliminary pattern layer PR1 may include an organic material. In an exemplary embodiment, the first preliminary pattern layer PR1 may be photoresist, for example.

Figure 17B:
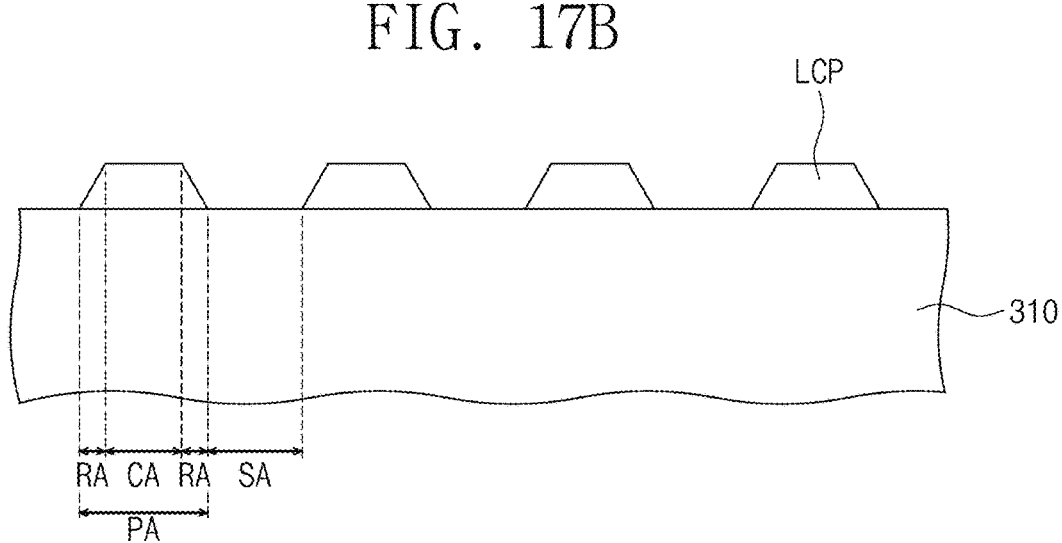

Thereafter, as illustrated in FIGS. 16 and 17B, lower light collection patterns LCP are disposed on the light guide member 310 (S2). Particularly, the lower light collection patterns LCP may be provided by patterning the first preliminary pattern layer PR1. In this exemplary embodiment, when the first preliminary pattern layer PR1 is the photoresist, the lower light collection patterns LCP may be patterned through a photolithography process. That is, although not shown, after light is irradiated onto the first preliminary pattern layer PR1, the first preliminary pattern layer PR1 may be etched to form the lower light collection patterns LCP. The light may be ultraviolet (UV) rays.

However, an exemplary embodiment of the invention is not specifically limited to the method for forming the lower light collection pattern LCP. In an exemplary embodiment, in another exemplary embodiment of the invention, when the lower light collection pattern LCP includes only an inorganic material, the process of forming the above-described first preliminary pattern layer PR1 may be omitted, for example. That is, the lower light collection patterns LCP may be directly disposed on the light guide member 310 without performing the photolithography process. Also, in further another exemplary embodiment of the invention, the lower light collection patterns LCP may be provided through an imprinting process.

The lower light collection patterns LCP overlaps a pattern area PA.

Figure 17C:
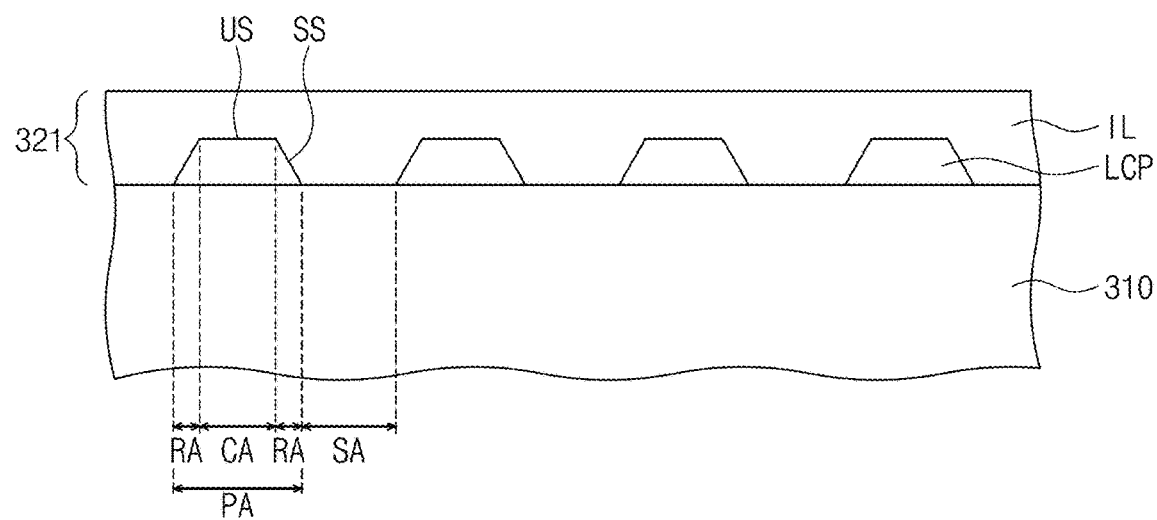

As illustrated in FIGS. 16 and 17C, an intermediate layer IL is disposed on the lower light collection patterns LCP (S3). The intermediate layer IL covers a top surface US and a side surface SS of each of the lower light collection patterns LCP and a top surface of the light guide member 310, which corresponds to a surrounding area SA.

Figure 17D:
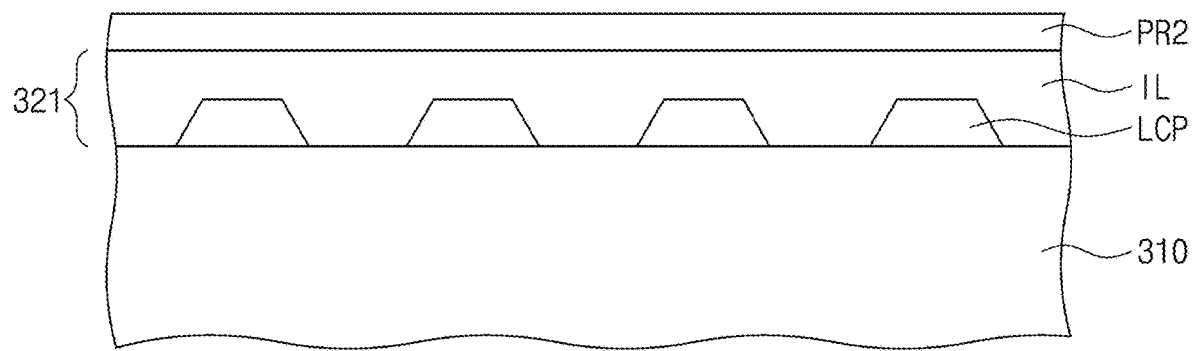

Thereafter, as illustrated in FIGS. 16 and 17D, a second preliminary pattern layer PR2 is disposed on the intermediate layer IL. The second preliminary pattern layer PR2 may include a thermal-curable or photo-curable material. In this exemplary embodiment, the second preliminary pattern layer PR2 may be photoresist.

Figure 17E:
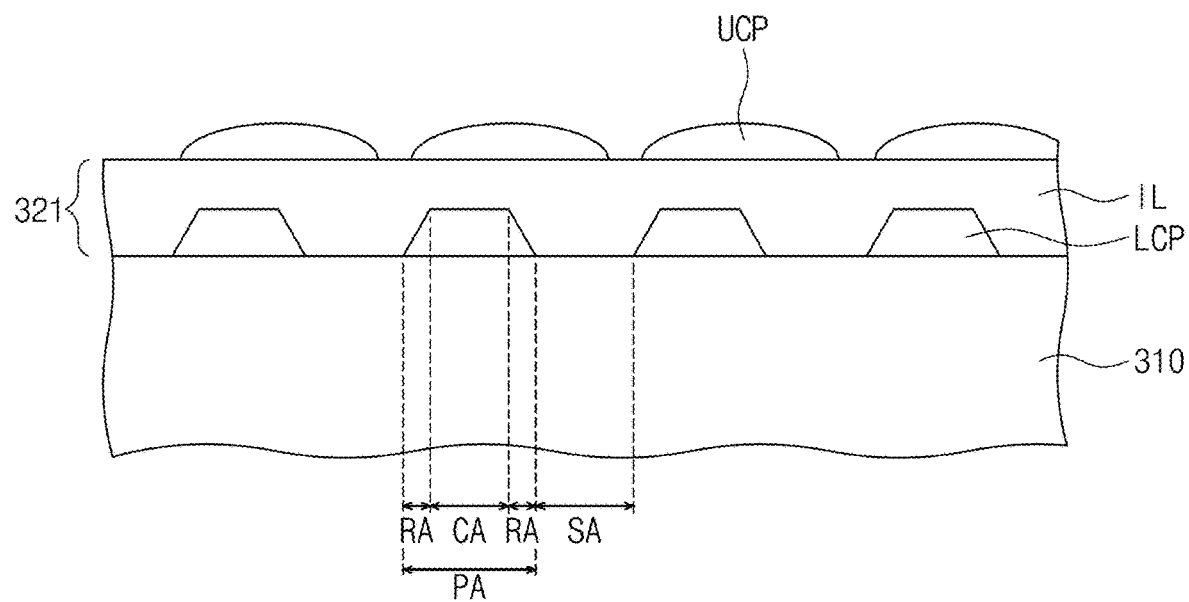

As illustrated in FIGS. 16 and 17E, upper light collection patterns UCP are disposed on the intermediate layer IL (S4). The upper light collection patterns UCP may be provided by patterning the second preliminary pattern layer PR2. In this exemplary embodiment, when the second preliminary pattern layer PR2 is the photoresist, the upper light collection patterns UCP may be patterned through a photolithography process. Also, in further another exemplary embodiment of the invention, the upper light collection patterns UCP may be provided through an imprinting process. However, an exemplary embodiment of the invention is not specifically limited to the method for forming the upper light collection pattern UCP.

Figure 17F:
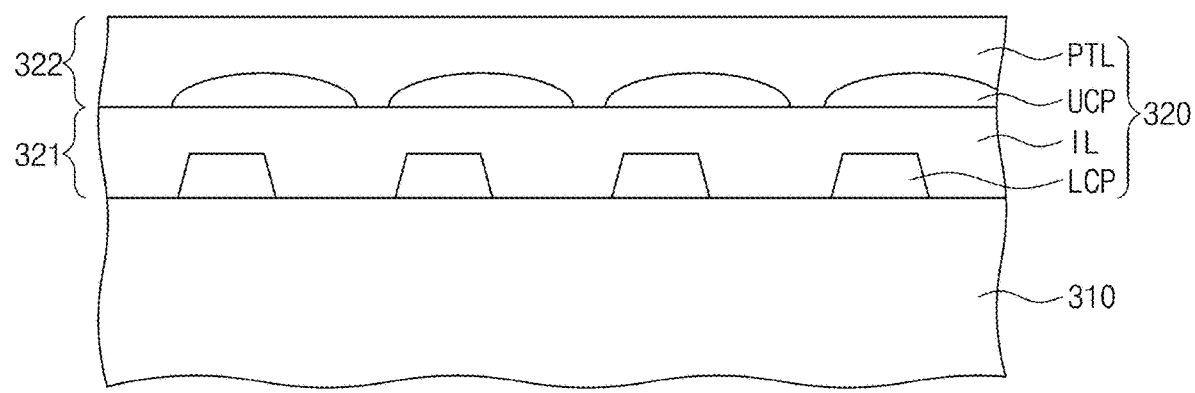

Thereafter, as illustrated in FIGS. 16 and 17F, a protection layer PTL is disposed on the upper light collection patterns UCP (S5). The protection layer PTL covers a top surface of the upper light collection patterns UCP and an area on the intermediate layer IL, which is exposed by the upper light collection patterns UCP.

According to the exemplary embodiments of the invention, the display apparatus may be improved in light collection efficiency. That is, according to the exemplary embodiments, the display apparatus may be improved in display quality.

It will be apparent to those skilled in the art that various modifications and variations may be made in the invention. Thus, it is intended that the invention covers the modifications and variations of this invention provided they come within the scope of the appended claims and their equivalents. Thus, to the maximum extent allowed by law, the scope of the invention is to be determined by the broadest permissible interpretation of the following claims and their equivalents, and shall not be restricted or limited by the foregoing detailed description.

What is claimed is:

1. A display apparatus comprising:
a display module which displays an image; and
a backlight unit disposed below the display module, the backlight unit comprising:
a light source which generates light;
a light guide member comprising a light incident surface which receives the light from the light source and an opposite surface facing the light incident surface in a first direction; and
a light collection member which is disposed on the light guide member and receives the light from the light guide member to control a traveling direction of the light so that the light travels to the display module, the light collection member comprising:
an upper light collection layer comprising upper light collection patterns, each of which has a curved top surface; and
a lower light collection layer which comprises lower light collection patterns and an intermediate layer which covers the lower light collection patterns, the lower light collection layer being disposed between the light guide member and the upper light collection layer, each of the lower light collection patterns comprises a top surface, a bottom surface, and a side surface which connects the top surface to the bottom surface and of which at least a portion is inclined to the opposite surface,
wherein
a first curved area inclined from a peak point to the opposite surface is defined on the top surface of an upper light collection pattern of the upper light collection patterns,
a center of the top surface is spaced apart with a first distance from the peak point in a direction from the opposite surface to the light incident surface in a plan view.

2. The display apparatus of claim 1, wherein a lower light collection pattern of the lower light collection patterns has a refractive index greater than that of the light guide member, and
the light guide member has a refractive index greater than that of the intermediate layer.

3. The display apparatus of claim 2, wherein the upper light collection pattern has the same refractive index as that of the intermediate layer.

4. The display apparatus of claim 3, wherein the upper light collection layer further comprises a protection layer which covers the upper light collection pattern, and
the protection layer has a refractive index greater than that of the upper light collection pattern.

5. The display apparatus of claim 1, wherein the top surface entirely overlaps the bottom surface in the plan view, and
the top surface has an area less than that of the bottom surface.

6. The display apparatus of claim 1, wherein a lower light collection pattern of the lower light collection patterns has a truncated cone shape.

7. The display apparatus of claim 1, wherein the side surface and the bottom surface of a lower light collection pattern of the lower light collection patterns has an angle of about 50 degrees to about 90 degrees therebetween.

8. The display apparatus of claim 1, wherein the more an angle between the side surface and the bottom surface of a lower light collection pattern of the lower light collection patterns decreases, the more a size of the upper light collection pattern increases.

9. The display apparatus of claim 1, wherein the more a distance between the upper light collection patterns increases in the direction from the opposite surface to the light incident surface, the more a thickness of the intermediate layer increases.

10. The display apparatus of claim 1, wherein a lower light collection pattern of the lower light collection patterns entirely overlaps the upper light collection pattern in the plan view.

11. The display apparatus of claim 10, wherein the upper light collection pattern comprises:
a first portion comprising the first curved area on the top surface; and
a second portion comprising a second curved area, which is inclined from the peak point to the light incident surface, on the top surface.

12. The display apparatus of claim 10, wherein the upper light collection pattern has a circular shape in the plan view.

13. The display apparatus of claim 1, wherein
the upper light collection patterns are disposed to one-to-one correspond to the lower light collection patterns.

14. The display apparatus of claim 13, wherein, in a cross-section parallel to the first direction, an n-th upper light collection pattern of the upper light collection patterns partially overlaps an (n+1)-th lower light collection pattern of the lower light collection patterns.

15. The display apparatus of claim 1, wherein the upper light collection pattern has a semicircular shape in the plan view.

16. The display apparatus of claim 1, wherein
the upper light collection patterns are arranged in the first direction, and each of the upper light collection patterns has a rectangular shape extending in a direction perpendicular to the first direction in the plan view, and
one of the upper light collection patterns is disposed to overlap the lower light collection patterns.

17. The display apparatus of claim 1, wherein the display module comprises:
a lower substrate;
an upper substrate facing the lower substrate;
a light conversion layer disposed below the upper substrate; and
a liquid crystal layer disposed between the lower substrate and the light conversion layer,
wherein the light conversion layer comprises a plurality of quantum dots.

18. The display apparatus of claim 1, wherein the backlight unit further comprises:
a first reflection member disposed below the light guide member; and
a second reflection member disposed on the opposite surface of the light guide member.

19. A display apparatus comprising:
a display module which displays an image; and
a backlight unit disposed below the display module, the backlight unit comprising:
a light source which generates light;
a light guide member comprising a light incident surface which receives the light from the light source and an opposite surface facing the light incident surface in a first direction; and
a light collection member which is disposed on the light guide member and receives the light from the light guide member to control a traveling direction of the light so that the light travels to the display module, the light collection member comprising:

an upper light collection layer comprising an upper light collection pattern having a curved top surface; and a lower light collection layer which comprises a lower light collection pattern and an intermediate layer having a refractive index less than that of the lower light collection pattern and covers the lower light collection pattern, the lower light collection layer being disposed between the light guide member and the upper light collection layer, the lower light collection pattern comprising:

a top surface, a bottom surface, and a side surface which connects the top surface to the bottom surface and of which at least a portion is inclined to the opposite surface, wherein a first curved area inclined from a peak point to the opposite surface is defined on the top surface of the upper light collection pattern, and a point, which is closest to the opposite surface, on the top surface of the lower light collection pattern overlaps the first curved area in a plan view.

* * * * *